US012752674B2

(12) United States Patent
Oka

(10) Patent No.: US 12,752,674 B2
(45) Date of Patent: Oct. 6, 2026

(54) VEHICLE SEAT WITH IMPROVED COORDINATION AND GUIDE MECHANISMS

(71) Applicant: TACHI-S CO., LTD., Ome (JP)

(72) Inventor: Shinichiro Oka, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 202 days.

(21) Appl. No.: 18/763,340

(22) Filed: Jul. 3, 2024

(65) Prior Publication Data

US 2025/0010765 A1 Jan. 9, 2025

(30) Foreign Application Priority Data

Jul. 6, 2023 (JP) ................................ 2023-111529

(51) Int. Cl.

*B60N 2/12* (2006.01)
*B60N 2/30* (2006.01)
*B60N 2/62* (2006.01)
*B60N 2/90* (2018.01)

(52) U.S. Cl.

CPC .............. *B60N 2/12* (2013.01); *B60N 2/3011* (2013.01); *B60N 2/62* (2013.01); *B60N 2/919* (2018.02); *B60N 2/995* (2018.02); *B60N 2002/948* (2018.02)

(58) Field of Classification Search

CPC ............ B60N 2002/948; B60N 2/3011; B60N 2/919; B60N 2/12; B60N 2/995; B60N 2/62

USPC ........................................................... 297/84

See application file for complete search history.

(56) References Cited

U.S. PATENT DOCUMENTS 8,646,840 B2 * 2/2014 Stojanovic ............... B60N 2/12
296/65.09
8,960,785 B2 * 2/2015 Kuno ................. B64D 11/0643
297/284.11
2014/0375087 A1 12/2014 Kuno et al.

FOREIGN PATENT DOCUMENTS

CN 215552678 U * 1/2022
JP 2015-003632 A 1/2015

* cited by examiner

*Primary Examiner* — Milton Nelson, Jr.
(74) *Attorney, Agent, or Firm* — WHDA, LLP

(57) ABSTRACT

To provide a vehicle seat that can achieve both of improvement in operability of a reclining operation and size reduction of the entire vehicle seat. This vehicle seat includes a link mechanism pivoted to a seat cushion (cushion frame), a seat back (back frame), and a leg rest (leg frame), and a hinge pin which is engageable with the link mechanism and disengageable therefrom. In the vehicle seat in a state of being between a seating position and a relaxation position, the hinge pin is engaged with the link mechanism. Accordingly, the seat back and the leg rest can be inclined in coordination with sliding movement of the seat cushion relative to a vehicle body. Thus, the vehicle seat can achieve both of improvement in operability of a reclining operation and size reduction of the entire vehicle seat.

6 Claims, 10 Drawing Sheets

VEHICLE SEAT WITH IMPROVED COORDINATION AND GUIDE MECHANISMS

TECHNICAL FIELD

The present invention relates to a vehicle seat, and in particular, relates to a vehicle seat that can achieve both of improvement in operability of a reclining operation and size reduction of the entire vehicle seat.

BACKGROUND ART

There is known a vehicular seat that can be reclined while coordinating a backrest of a seat (seat back) and an ottoman (leg rest) with each other (Japanese Patent Application Laid-Open (kokai) No. 2015-003632).

SUMMARY OF THE INVENTION

Problems to be Solved by the Invention

However, in the above conventional configuration, a seat cushion of the vehicle seat is not coordinated, though the seat back and the leg rest are coordinated with each other.

Therefore, in order to recline the entire seat, it is necessary to separately perform an operation of reclining the seat cushion in addition to an operation of reclining while coordinating the seat back and the leg rest with each other. Thus, a reclining operation for reclining the entire vehicle seat is likely to be complicated. In addition, in a case where an electric reclining mechanism is provided and positions of parts (seat cushion, seat back, and leg rest) of the vehicle seat are registered so that the entire vehicle seat is reclined, operability of a reclining operation can be improved, but it is necessary to provide a reclining mechanism to each part and the entire vehicle seat is likely to increase in size. That is, there is a problem that improvement in operability of a reclining operation and size reduction of the entire vehicle seat cannot be both achieved.

The present invention has been made to solve the above problem, and an object of the present invention is to provide a vehicle seat that can achieve both of improvement in operability of a reclining operation and size reduction of the entire vehicle seat.

Means for Solving the Problems

To achieve the above object, a vehicle seat of the present invention includes: a seat cushion provided at a floor surface of a vehicle body so as to be able to perform sliding movement; a seat back rotatably pivoted to a back end side of the seat cushion and configured to be inclinable relative to the seat cushion; a leg rest rotatably pivoted to a front end side of the seat cushion and configured to be inclinable relative to the seat cushion; and a coordination mechanism which coordinates sliding movement of the seat cushion, inclination of the seat back, and inclination of the leg rest with each other. The coordination mechanism is configured to, in coordination with sliding movement of the seat cushion toward a front side, incline the seat back toward a backward inclining direction and incline the leg rest toward a frontward protruding direction, and in coordination with sliding movement of the seat cushion toward a back side, incline the seat back toward a stand-up direction and incline the leg rest toward a receding direction.

Advantageous Effects of the Invention

With the vehicle seat according to a first aspect, the coordination mechanism is configured to, in coordination with sliding movement of the seat cushion toward the front side, incline the seat back toward the backward inclining direction and incline the leg rest toward a frontward protruding direction, and in coordination with sliding movement of the seat cushion toward the back side, incline the seat back toward the stand-up direction and incline the leg rest toward the receding direction. Therefore, the posture of the entire vehicle seat including the seat back and the leg rest can be changed through only an operation of performing sliding movement of the seat cushion. Thus, operability of a reclining operation can be improved.

In addition, by the coordination mechanism, both orientations of the seat back and the leg rest can be changed in coordination with sliding movement of the seat cushion. This makes it unnecessary to provide each of the seat cushion, the seat back, and the leg rest with a reclining mechanism for changing an orientation thereof, so that the entire vehicle seat can be downsized. As a result, improvement in operability of a reclining operation and size reduction of the entire vehicle seat can be both achieved.

With the vehicle seat according to a second aspect, the effects provided by the vehicle seat according to the first aspect are provided, and in addition, a plane on which the seat cushion performs sliding movement is downward sloped from the front side toward the back side. Therefore, when the seat cushion is brought back from the front side toward the back side, the seat cushion can easily perform sliding movement (can be easily brought back) by the self-weight of a seated person even if an extra force for raising the seat back is needed in addition to a force for performing sliding movement of the seat cushion. Thus, operability of a reclining operation can be improved.

With the vehicle seat according to a third aspect, the effects provided by the vehicle seat according to the second aspect are provided, and in addition, the angle of the downward sloping is set to be not greater than 4°. Therefore, even if the plane on which the seat cushion performs sliding movement is downward sloped from the front side toward the back side, the angle of the sloping is mild, so that sliding movement for moving the seat cushion from the back side toward the front side is facilitated and sliding movement for bringing back the seat cushion from the front side toward the back side is facilitated. Thus, operability of a reclining operation can be improved.

With the vehicle seat according to a fourth aspect, the effects provided by the vehicle seat according to the first aspect are provided, and in addition, the coordination mechanism includes a striker provided to the vehicle body, and a guide mechanism which is provided to the seat back and guides inclination of the seat back relative to the striker. Therefore, inclination of the seat back toward the stand-up direction and inclination of the seat back toward the backward inclining direction can be performed in coordination with sliding movement of the seat cushion, while the seat back can be supported by the striker. Thus, rigidity of the vehicle seat can be improved.

In addition, in the vehicle seat, the coordination mechanism is configured to, in coordination with sliding movement of the seat cushion toward the front side, incline the seat back toward the backward inclining direction and incline the leg rest toward a frontward protruding direction. Therefore, when a seated person performs a reclining operation while leaning back against the seat back, inclination of the seat back toward the backward inclining direction relative to the striker is guided by the guide mechanism and a part of the seat back that is pivoted to the seat cushion is moved toward the front side. Thus, the seat cushion can easily perform sliding movement toward the front side by the self-weight of the seated person (a weight when the seated person leans against the seat back). As a result, operability of a reclining operation can be improved.

With the vehicle seat according to a fifth aspect, the effects provided by the vehicle seat according to the fourth aspect are provided, and in addition, surfaces of the first sliding portion and the second sliding portion on a side opposite to a side where the striker slides, an end surface of the first vertically-formed portion, and an end surface of the second vertically-formed portion, are joined to the inner surface of the cover. Thus, a load that the first sliding portion and the second sliding portion receive from the striker can be dispersed to the cover. As a result, the strength of the guide mechanism (cover and reinforcement member) can be improved.

With the vehicle seat according to a sixth aspect, the effects provided by the vehicle seat according to the fifth aspect are provided, and in addition, the lock mechanism is able to switch, by rotating the nail, between a locked state in which the nail blocks the first path and the second path from communicating with each other, and a lock-released state in which the first path and the second path communicate with each other. Therefore, by rotating the nail, the striker is allowed to be pulled out from the cover. In this state, by inclining the seat back toward the forward-inclined direction, an operation of pulling out the striker (and an operation for a fall-down action) can be completed on the seat back side. Thus, operability in the fall-down action can be improved.

With the vehicle seat according to a seventh aspect, the effects provided by the vehicle seat according to the sixth aspect are provided, and in addition, the coordination mechanism includes an engagement portion provided to the seat back, and a connection member pivoted to each of the seat cushion, the seat back, and the leg rest, and the connection member is provided on a side where the seat back is inclined toward a backward inclining direction, relative to the engagement portion. Therefore, by performing sliding movement of the seat cushion so as to incline the seat back toward the backward inclining direction or the stand-up direction, the engagement portion and the connection member are engaged with each other and coordination can be performed. In addition, the connection member is not provided on a side where the seat back is inclined toward the stand-up direction, relative to the engagement portion. Therefore, by inclining only the seat back toward the stand-up direction independently, the engagement portion and the connection member are separated from each other and coordination is released. Accordingly, a structure for engaging the engagement portion and the connection member with each other and releasing the engagement can be simplified. Thus, the manufacturing cost for components can be reduced and the number of assembly steps for the components can be decreased. As a result, the manufacturing cost for the vehicle seat can be reduced.

In addition, the seat cushion and the leg rest are formed such that a member that restricts movement of the seat back and the engagement portion is not provided on a path through which the seat back and the engagement portion move, when the lock mechanism is in the lock-released state and the seat back is inclined in a range from the first position to a position where the seat back overlaps the seat cushion. Thus, it is possible to perform the fall-down action of the vehicle seat simply by releasing lock of the lock mechanism and inclining the seat back from the first position toward the position overlapping the seat cushion.

Further, by inclining the seat back from the first position toward the position overlapping the seat cushion, the engagement portion and the connection member are separated from each other, whereby coordination can be released. This makes it unnecessary to perform an operation for releasing coordination in the fall-down action. Thus, an operation in the fall-down action can be simplified. As a result, operability can be improved.

MODES FOR CARRYING OUT THE INVENTION

Figure 1:
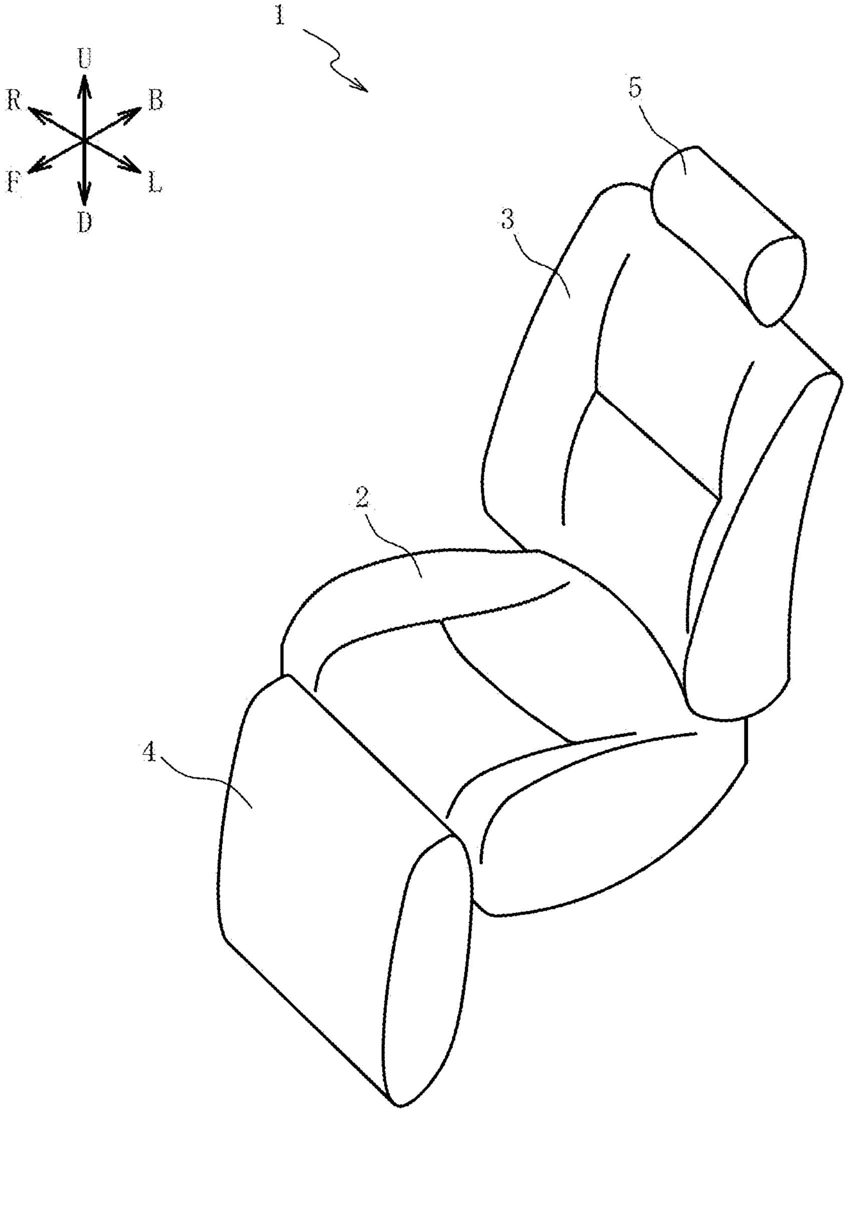
FIG. 1 is a perspective view of a vehicle seat according to an embodiment.

Hereinafter, a preferred embodiment of the present invention will be described with reference to the accompanying drawings. FIG. 1 is a perspective view of a vehicle seat 1 according to an embodiment of the present invention. In the drawings, an arrow F-B, an arrow U-D, and an arrow L-R indicate a front-back direction, an up-down direction, and a left-right direction of the vehicle seat 1, respectively (the same applies to FIG. 2 to FIG. 10B).

As shown in FIG. 1, the vehicle seat 1 is a seat used in an automobile, a railroad vehicle, or an aircraft. The vehicle seat 1 includes a seat cushion 2 for supporting a hip when a person is seated, a seat back 3 for supporting the back of the seated person, a leg rest 4 for supporting the legs of the seated person, and a headrest 5 for supporting the head of the seated person. In the present embodiment, the vehicle seat 1 is a seat located on the left side (arrow L direction side), of rear seats of an automobile, and is provided such that the frontward direction (arrow F direction) of the vehicle seat 1 coincides with the frontward direction of the automobile.

The vehicle seat 1 may be a seat in a third or subsequent row in the automobile or may be located on the right side (arrow R direction side) or the center side.

As a reclining operation for the vehicle seat 1, it is conceivable that an operator (seated person) operates the seat back 3 so that the orientations of the seat cushion 2 and the leg rest 4 are changed in coordination with inclination of the seat back 3, or an operator operates the leg rest 4 so that the orientations of the seat cushion 2 and the seat back 3 are changed in coordination with inclination of the leg rest 4. However, for convenience of description, a method in which an operator operates the seat cushion 2 so that the orientations of the seat back 3 and the leg rest 4 are changed in coordination with sliding movement of the seat cushion 2 will be described, as an example.

The vehicle seat 1 includes a coordination mechanism (in the present embodiment, a cover 32, a first reinforcement member 35, a second reinforcement member 36, a lock mechanism 39, a hinge pin 38, a link mechanism 60, and a striker 70 (see FIG. 2, FIG. 9A, FIG. 9B, and FIG. 9C) in which, when the seat cushion 2 performs sliding movement relative to a floor surface Bd1 (see FIG. 4A) of a vehicle body Bd, the seat back 3 is inclined toward a stand-up direction or inclined toward a backward inclining direction, and at the same time, the leg rest 4 is inclined toward a frontward (arrow F direction) protruding direction or inclined toward a receding direction.

In the vehicle seat 1 of the present invention, the orientations of the seat back 3 and the leg rest 4 can be changed by the seat cushion 2 performing sliding movement relative to the vehicle body Bd. Thus, the entire vehicle seat 1 can be downsized as compared to a vehicle seat in which a reclining mechanism for changing an orientation is provided for each of the seat cushion 2, the seat back 3, and the leg rest 4. Therefore, the vehicle seat 1 can be employed even for a vehicle such as a light automobile or an SUV in which the compartment space is comparatively narrow and only a limited space can be used.

In addition, without performing an operation of changing an orientation for each of the seat cushion 2, the seat back 3, and the leg rest 4, a reclining operation for the entire vehicle seat 1 can be completed only through sliding movement of the seat cushion 2. Thus, with the vehicle seat 1, operability of the reclining operation can be improved.

Figure 2:
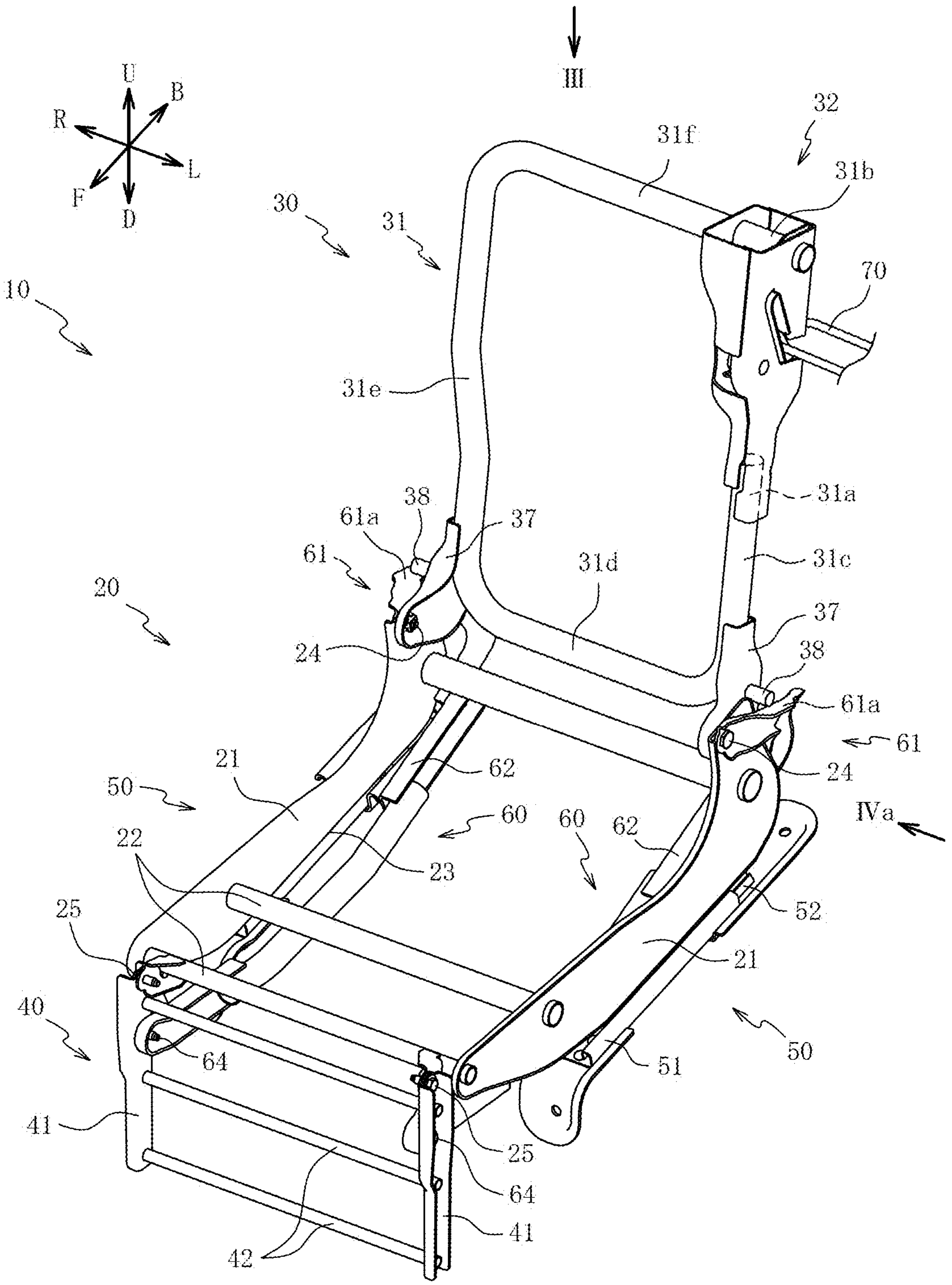
FIG. 2 is a perspective view of a seat frame.
Figure 3:
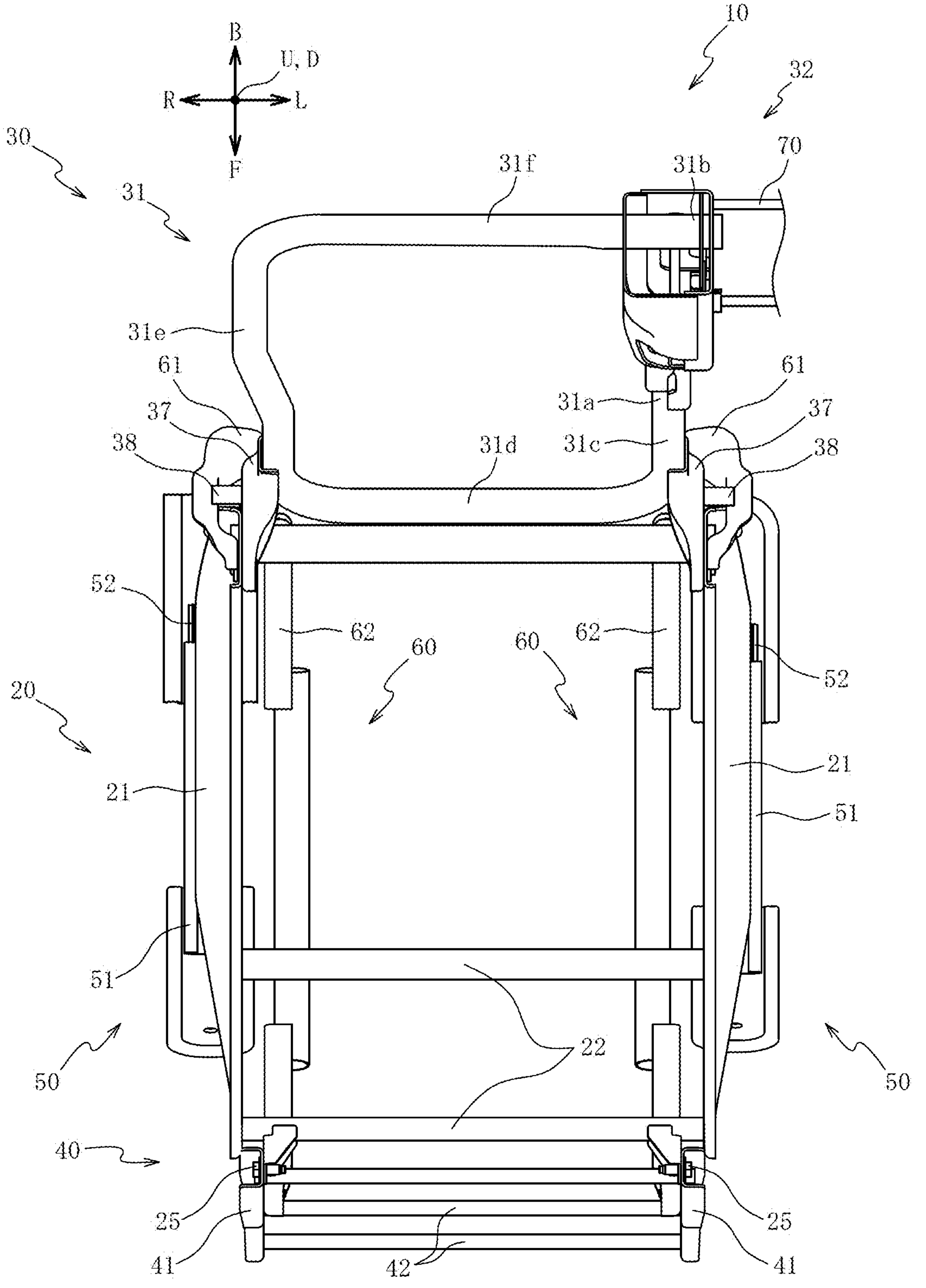
FIG. 3 is a top view of the seat frame as seen from an arrow III direction in FIG. 2.
Figure 4A:
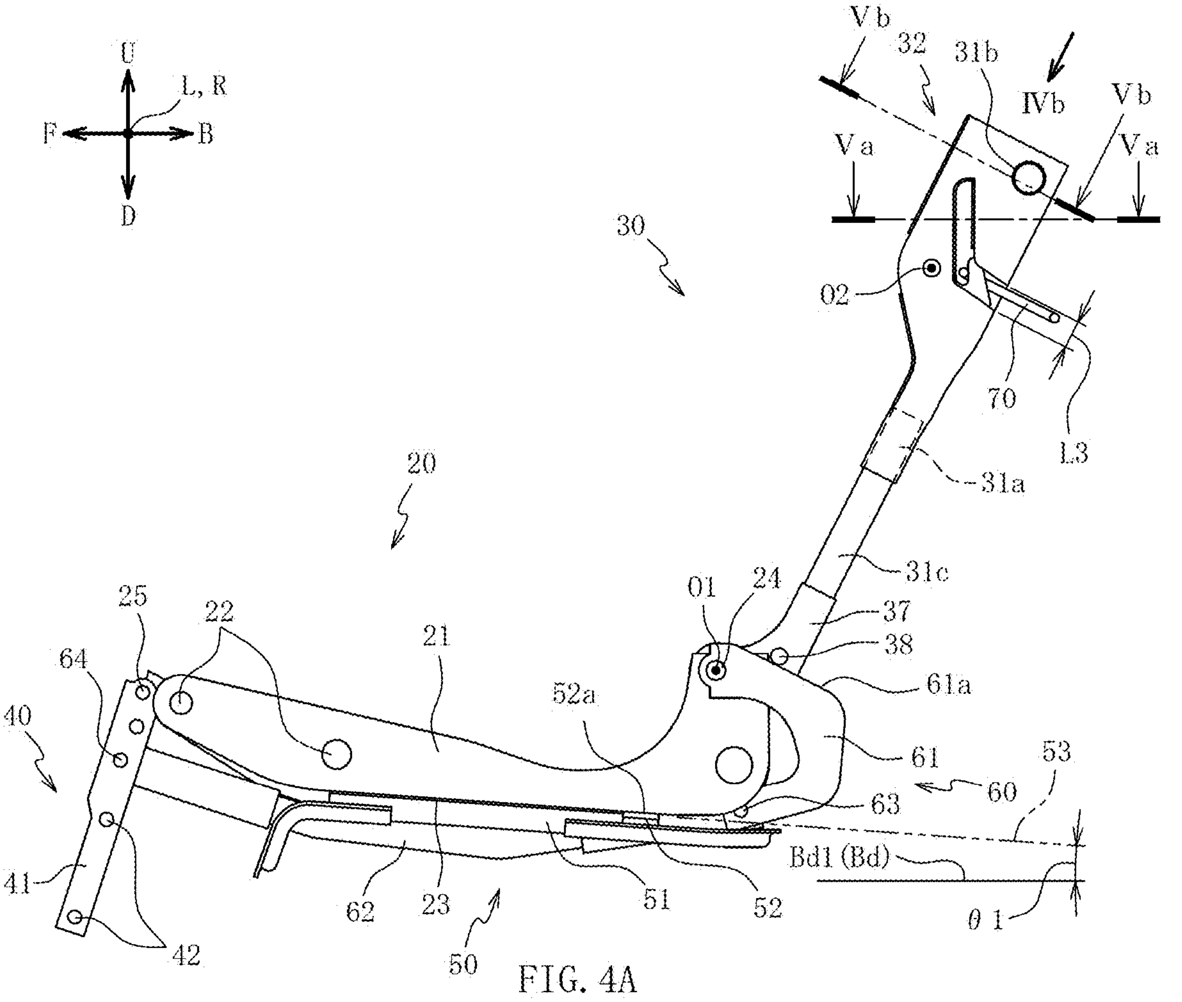
FIG. 4A is a side view of the seat frame as seen from an arrow IVa direction in FIG. 2.

Next, with reference to FIG. 2, FIG. 3, and FIG. 4A, a seat frame 10 which is a framework of the vehicle seat 1 will be described. FIG. 2 is a perspective view of the seat frame 10, FIG. 3 is a top view of the seat frame 10 as seen from an arrow III direction in FIG. 2, and FIG. 4A is a side view of the seat frame 10 as seen from an arrow IVa direction in FIG. 2. In FIG. 2, FIG. 3, and FIG. 4A, a frame of the headrest 5 in FIG. 1 and a plate provided in back (B direction) of a pipe 31 of a back frame 30 are not shown (the same applies to FIG. 5A, FIG. 5B, FIG. 10A and FIG. 10B).

As shown in FIG. 2, FIG. 3, and FIG. 4A, the seat frame 10 includes a cushion frame 20 which is made of steel and is a framework of the seat cushion 2, a back frame 30 which is made of steel and is a framework of the seat back 3 and which is rotatably pivoted to a back (arrow B direction) side of the cushion frame 20, a leg frame 40 which is made of steel and is a framework of the leg rest 4 and which is rotatably pivoted to a front (arrow F direction) side of the cushion frame 20, and a head frame (not shown) which is made of steel and is a framework of the headrest 5.

The cushion frame 20 includes side frames 21 which are plate-shaped members extending in the front-back direction (arrow F-B direction) and are provided so as to be separated from and opposed to each other in the left-right direction (arrow L-R direction), and a plurality of (in the present embodiment, three) pipes 22 connecting the two opposed side frames 21 in the opposing direction. A lower surface 23 of each side frame 21 is formed in a planar shape.

The lower surfaces 23 of the side frames 21 are supported by seat slides 50 such that the entire cushion frame 20 can perform sliding movement relative to the floor surface Bd1 of the vehicle body Bd.

In the vehicle seat 1, the back frame 30 and link mechanisms 60 are rotatably pivoted relative to the side frames 21 (cushion frame 20) by first shafts 24 inserted into the back end sides of the side frames 21, and the leg frame 40 is rotatably pivoted relative to the side frame 21 by second shafts 25 inserted into the front end sides of the side frames 21. The axial direction of the first shafts 24 and the axial direction of the second shafts 25 extend in the left-right direction (arrow L-R direction) and are parallel to each other.

The back frame 30 includes a cylindrical pipe 31 extending to form sides of a substantially rectangular shape, side frames 37 made of steel and provided on the lower end side of the pipe 31, and a cover 32 which is hollow inside and is connected between ends 31*a*, 31*b* of the pipe 31.

The pipe 31 has one end 31*a* whose outer peripheral surface is connected to a lower end of the cover 32 (see FIG. 5B), and includes a left side portion 31*c* extending downward (arrow D direction) from the above connected part, a bottom portion 31*d* extending rightward (arrow R direction) from a lower end of the left side portion 31*c*, a right side portion 31*e* extending upward (arrow U direction) from a right end of the bottom portion 31*d*, and an upper portion 31*f* extending leftward from an upper end of the right side portion 31*e* (arrow L direction). The upper portion 31*f* has another end 31*b* penetrating the cover 32 in the transverse direction (left-right direction (arrow L-R direction)). The end 31*b* is, of the upper portion 31*f*, a part located inside the cover 32 and a part protruding leftward from the outer surface of the cover 32.

Figure 8A:
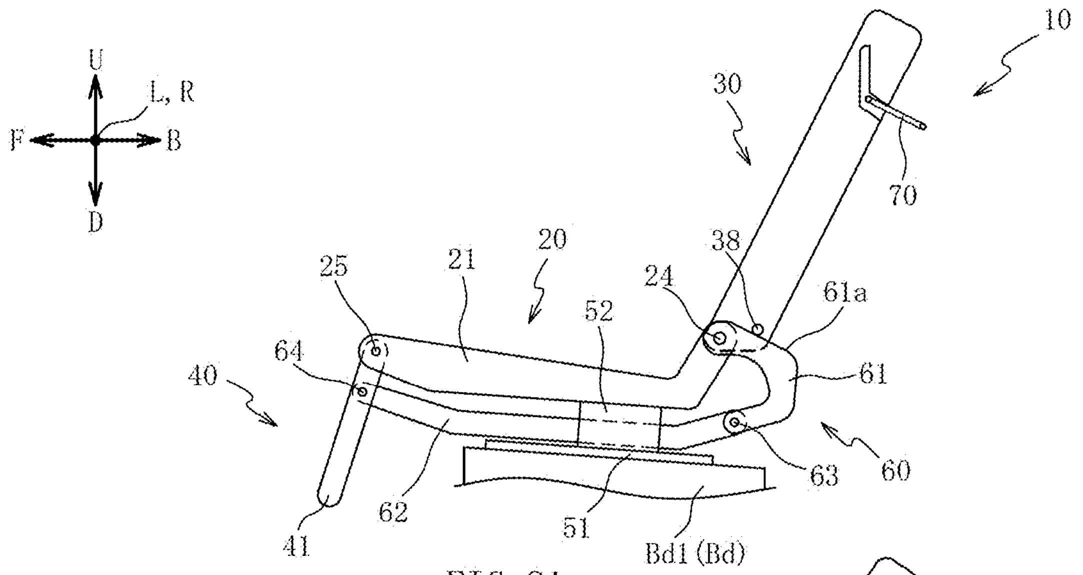
FIG. 8A is a schematic view of the seat frame in a seating position.

In the present embodiment, regarding the vehicle seat 1, a position where the seat cushion 2 (cushion frame 20) is located on the most backward side (arrow B direction), and in a movable range through coordination, the seat back 3 (back frame 30) stands up most and the leg rest 4 (leg frame 40) recedes most, is defined as a seating position (see FIG. 8A). A position where the seat cushion 2 is located on the most frontward side (arrow F direction), and in the movable range through coordination, the seat back 3 is inclined most backward and the leg rest 4 protrudes most frontward, is defined as a relaxation position (see FIG. 8C). A middle position between the seating position and the relaxation position is defined as a work position (see FIG. 8B). In addition, an action of collapsing the seat back 3 so that the headrest 5 side of the seat back 3 overlaps a front (arrow F direction) part of the seat cushion 2 is defined as a fall-down action (see FIG. 10A and FIG. 10B).

The side frames 37 are plate-shaped members provided so as to be separated from and opposed to each other in the left-right direction (arrow L-R direction), and inner surfaces (surfaces facing the center of the seat frame 10) of the side frames 37 are located on the lower end sides of the left side portion 31*c* and the right side portion 31*e* of the pipe 31. Each side frame 37 is rotatably pivoted by the first shaft 24 such that an outer surface (a surface opposite to the surface facing the center of the seat frame 10) of the side frame 37 is opposed to an inner surface of the side frame 21. Since the side frames 37 are rotatably pivoted relative to the side frames 21, the seat back 3 (back frame 30) is allowed to be inclined toward the stand-up direction and inclined toward the backward inclining direction relative to the seat cushion 2 (cushion frame 20). The centers of gravity of the back frame 30 and the seat back 3 are located on the back side (arrow B direction) relative to the first shafts 24, in a state in which the vehicle seat 1 is between the seating position and the relaxation position.

Each side frame 37 is provided with the cylindrical hinge pin 38 protruding outward from an outer surface. In a state in which the vehicle seat 1 is between the seating position and the relaxation position, the hinge pin 38 is located on the back side (arrow B direction) relative to the first shaft 24, and contacts with an upper (arrow U direction) surface of an outer periphery 61*a* of a link bracket 61 described later. In addition, the hinge pin 38 is separated from the upper surface of the outer periphery 61*a* during the fall-down action (during an operation of inclining the seat back 3 frontward from the seating position).

Figure 4B:
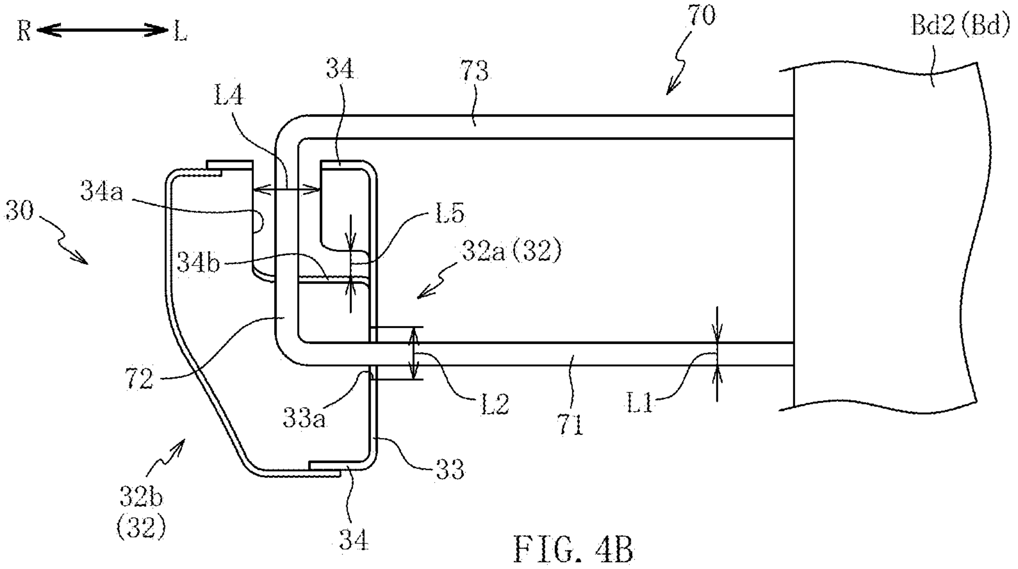
FIG. 4B is an arrow-direction view of a back frame as seen from an arrow IVb direction in FIG. 4A.
Figure 5A:
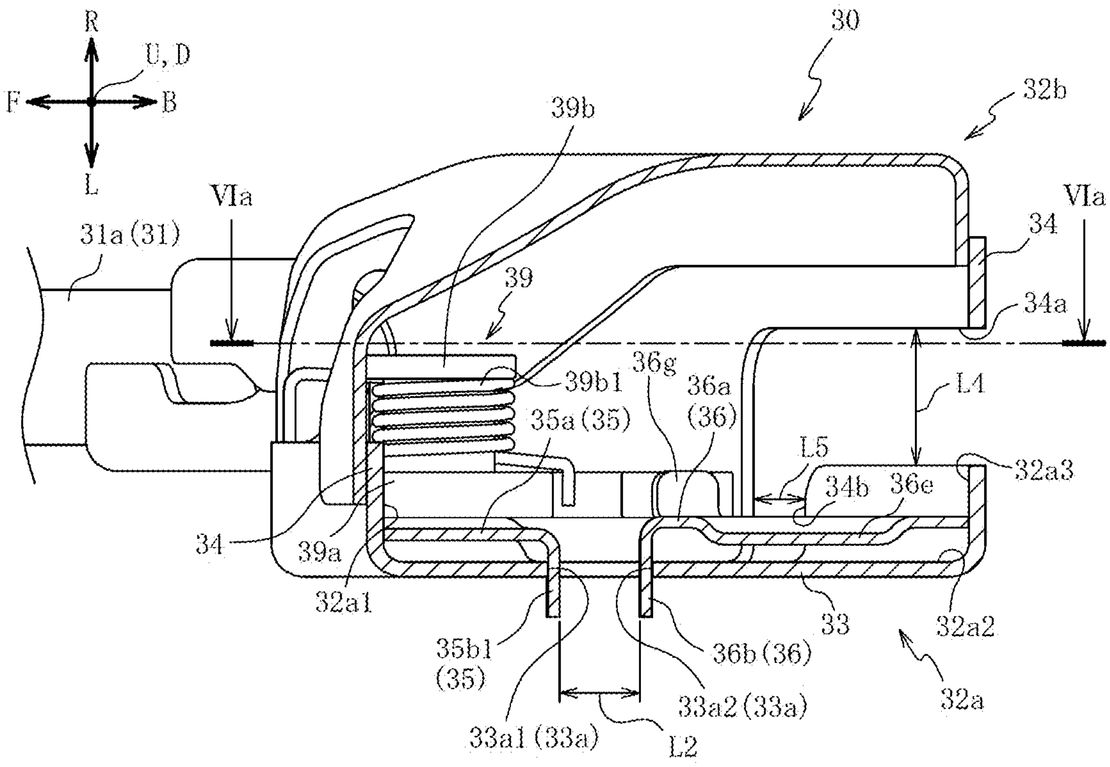
FIG. 5A is a sectional view of the back frame along line Va-Va in FIG. 4A.
Figure 6A:
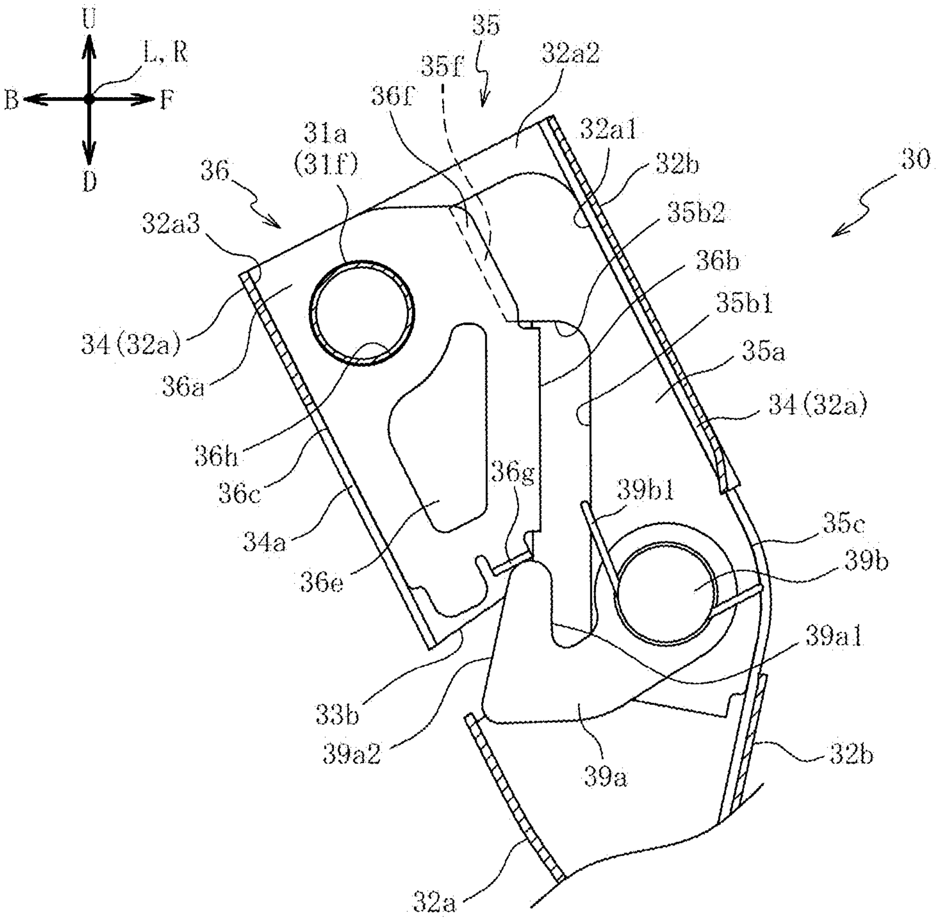
FIG. 6A is a sectional view of the back frame along line VIa-VIa in FIG. 5A.

The cover 32 includes a first cover 32*a* having elongated holes 33*a*, 34*a* and slits 33*b*, 34*b* through which the striker 70 is inserted, and a second cover 32*b* joined to the first cover 32*a* so as to form a space inside (see FIG. 4B, FIG. 5A, and FIG. 6A).

The leg frame 40 includes side frames 41 provided so as to be separated from and opposed to each other in the left-right direction (arrow L-R direction), and a plurality of (the present embodiment, three) pipes 42 connecting the two opposed side frames 41 in the opposing direction.

Each side frame 41 is a plate-shaped member extending in a longitudinal direction and one end side thereof is rotatably pivoted by the second shaft 25 of the cushion frame 20. One end of a link bar 62 (described later) to which the side frame 41 is rotatably pivoted by a third shaft 64 is connected to the side frame 41 on the other-end side relative to the pivoting position at the second shaft 25.

Each seat slide 50 is provided on an upward (arrow U direction) protruding base part of the floor surface Bd1 of the vehicle body Bd. The seat slide 50 supports the seat cushion 2 (cushion frame 20) so that the seat cushion 2 can perform sliding movement relative to the floor surface Bd1 of the vehicle body Bd.

The seat slide 50 includes a slide rail 51 fixed to the base part of the floor surface Bd1 and extending in a longitudinal direction, a slide portion 52 supported by the slide rail 51 so as to be able to perform sliding movement in the longitudinal direction on the slide rail 51, and a slide lock operation portion (not shown) which can restrict sliding movement of the slide portion 52 and release the restriction. The lower surface 23 of the side frame 21 is fixed to an upper surface 52*a* of the slide portion 52.

The slide portion 52 has a lock nail (not shown) which can be inserted/extracted into/from a lock hole (not shown) formed in the slide rail 51. In a state in which the slide lock operation portion is not operated, the lock nail is inserted into the lock hole, whereby sliding movement of the seat cushion 2 (cushion frame 20) relative to the vehicle body Bd is restricted. By the slide lock operation portion being operated, insertion of the lock nail into the lock hole is released, whereby sliding movement of the seat cushion 2 (cushion frame 20) relative to the vehicle body Bd is allowed.

In the present embodiment, positions where sliding is locked are three positions which are the seating position, the work position, and the relaxation position. Regarding relative positions of the slide portion 52 with respect to the slide rail 51 in the above respective positions, the slide portion 52 is located on the most backward side (arrow B direction) in the seating position (see FIG. 8A), located on the most frontward side (arrow F direction) in the relaxation position (see FIG. 8C), and located at a middle position between the seating position and the relaxation position, in the work position (see FIG. 8B).

A slide plane 53 on which the seat cushion 2 (cushion frame 20) slides relative to the vehicle body Bd is downward sloped from the front (arrow F direction) side of the cushion frame 20 toward the back (arrow B direction) side. In the present embodiment, an angle θ1 of the downward sloping is set at 4°. The angle θ1 is an angle formed by the slide plane 53 and the floor surface Bd1 excluding the base part of the vehicle body Bd. The floor surface Bd1 of the vehicle body Bd excluding the base part is a flat surface perpendicular to the gravity direction and parallel to a flat ground.

By setting the angle θ1 at 4°, at the time of performing sliding movement of the seat cushion 2 from the front (arrow F direction) side to the back (arrow B direction) side, backward sliding movement is facilitated using the weight of a seated person. Conversely, at the time of performing sliding movement of the seat cushion 2 from the back side to the front side, it is possible to sufficiently perform frontward sliding movement by a force transmitted to the seat cushion 2 on the basis of the weight of the seated person applied to the seat back 3. Thus, sliding movement of the seat cushion 2 is facilitated, so that operability of a reclining operation can be improved. Although the angle θ1 is set at 4° in the present embodiment, the angle θ1 may be smaller than 4°.

Each link mechanism 60 includes the link bracket 61 having one end side rotatably pivoted to the side frame 21 by the first shaft 24, and the link bar 62 rotatably pivoted to another end side of the link bracket 61 via a link shaft 63 and extending from the rear side (arrow B direction) to the front side (arrow F direction) of the vehicle seat 1. The link bar 62 on a side opposite to the link shaft 63 is rotatably pivoted to the side frame 41 by the third shaft 64. The side frame 37, the side frame 21, and the link bracket 61 are pivoted to each other in an order of the side frame 37, the side frame 21, and then the link bracket 61 from the inner side to the outer side of the vehicle seat 1, by the first shaft 24.

The link bracket 61 is a plate-shaped member made of steel and formed in a C shape. The link bracket 61 is pivoted to the side frame 21 by the first shaft 24 such that an inner surface on one end side of the link bracket 61 is opposed to the outer surface of the side frame 21. In a top view, the link bracket 61 is bent from the outer surface toward the inner surface of the side frame 21 as extending from one end side toward another end side, and the other end side of the link bracket 61 is located on the inner side relative to the side frame 21. Since the link bar 62 is pivoted to the other end side of the link bracket 61, the link bar 62 can be provided on the inner side relative to the side frame 21 and the seat slide 50 provided below the side frame 21. As a result, the link bar 62 is prevented from protruding outward relative to the seat slide 50, whereby the size in the left-right direction (arrow L-R direction) of the vehicle seat 1 can be reduced. Thus, the vehicle seat 1 can be downsized.

In a state in which the vehicle seat 1 is between the seating position and the relaxation position, the upper (arrow U direction) surface of the outer periphery 61*a* of the link bracket 61 on the side where the hinge pin 38 is provided has a straight shape in a side view (see FIG. 4A).

The link bar 62 is a member for transmitting a force of rotation of the link bracket 61 about an axis O1 of the first shaft 24 to the leg frame 40 (side frame 41). The other end side of the link bar 62 is pivoted to the link bracket 61 by the link shaft 63, and the one end side of the link bar 62 is pivoted to the side frame 41 by the third shaft 64. The link bracket 61 is rotatably pivoted to the cushion frame 20 by the first shaft 24. Therefore, when a load is inputted to (presses) the outer periphery 61*a* from the hinge pin 38, a force in a perpendicular direction acts on the upper (arrow U direction) surface of the outer periphery 61*a*, so that the link bracket 61 rotates clockwise in a side view (see FIG. 4A). Since the link bar 62 is pivoted to the link bracket 61, the link bar 62 transmits the load inputted to the link bracket 61, in a direction to push the side frame 41.

With reference to FIG. 4B, the striker 70 will be described. FIG. 4B is an arrow-direction view of the back frame 30 as seen from an arrow IVb direction in FIG. 4A. In FIG. 4B, the first reinforcement member 35, the second reinforcement member 36, the lock mechanism 39, and the pipe 31 provided in the cover 32 are not shown.

As shown in FIG. 4B, the striker 70 is a member which is made of steel and fixed to the vehicle body Bd and which is formed in substantially a U shape by bending a columnar bar. The striker 70 includes an insertion portion 71 extending from a wall portion Bd2 of the vehicle body Bd toward the cover 32, a connection portion 72 contiguous to the insertion portion 71 and extending backward (arrow B direction) from one end of the insertion portion 71, and a non-insertion portion 73 contiguous to another end of the connection portion 72 and extending from the other end toward the wall portion Bd2 of the vehicle body Bd. The insertion portion 71 and the non-insertion portion 73 are parallel to each other, and the connection portion 72 connects the above two portions.

Figure 9A:
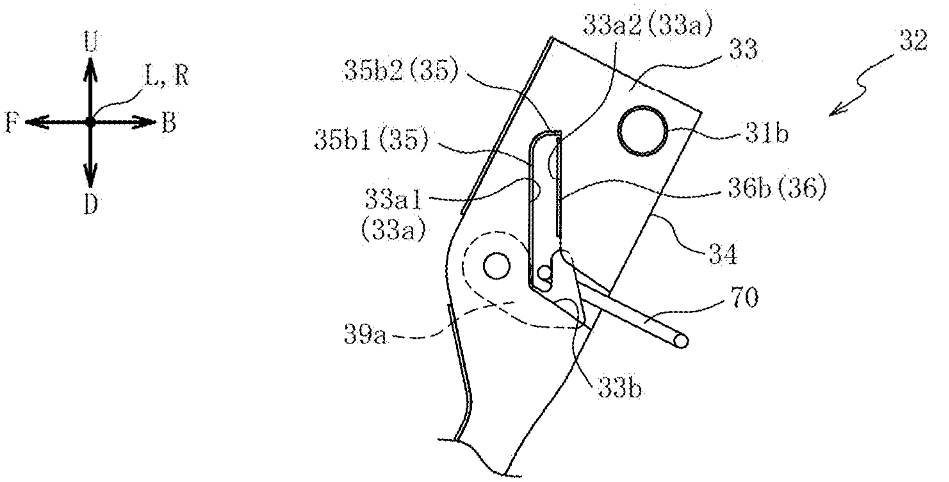
FIG. 9A is a side view of a cover in the seating position.
Figure 9B:
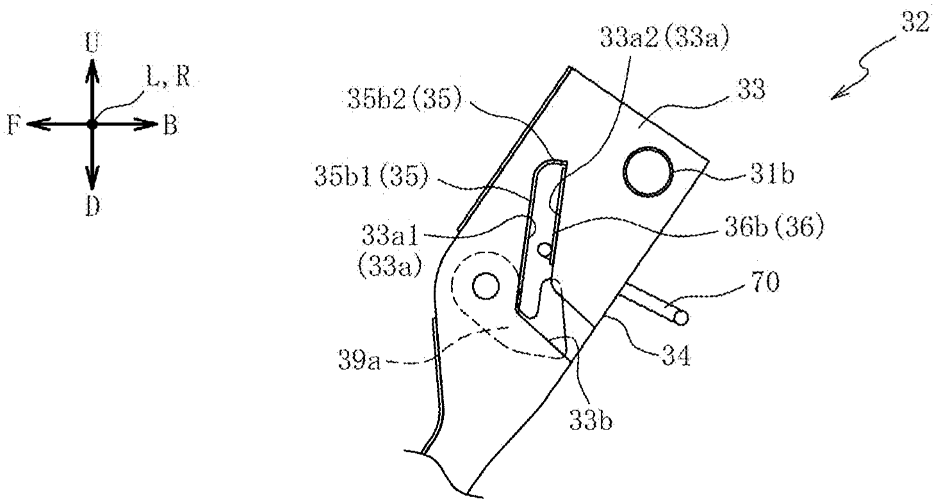
FIG. 9B is a side view of the cover in the work position.
Figure 9C:
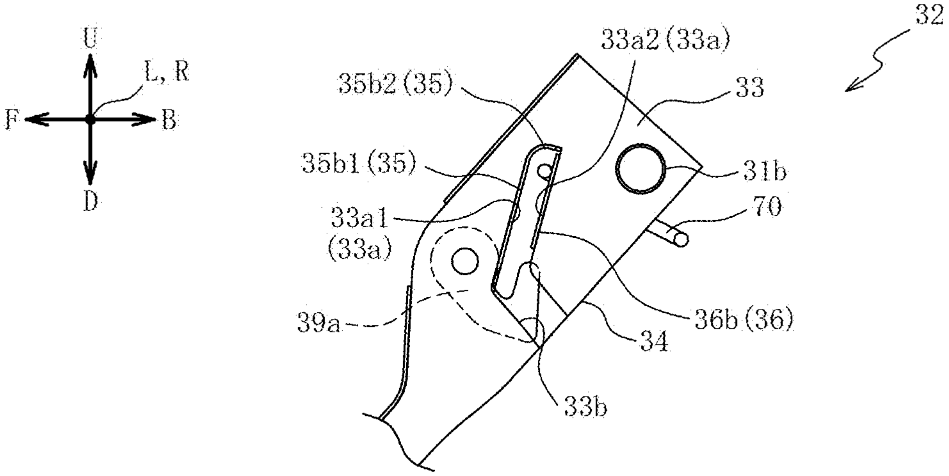
FIG. 9C is a side view of the cover in the relaxation position.

In a state in which the vehicle seat 1 is between the seating position and the relaxation position, the striker 70 passes through a path formed between a first portion 35*b*1 and a slide portion 36*b*, and passes through the elongated hole 33*a* at the same time (see FIG. 9A to FIG. 9C). At this time, the end side of the insertion portion 71 inserted into the elongated hole 33*a* of a side surface portion 33 is located inside the cover 32. Of the connection portion 72, a part on the insertion portion 71 side is located inside the cover 32, and a part on the non-insertion portion 73 side protrudes outward of the cover 32 from the elongated hole 34*a* of an erected portion 34 on the back (arrow B direction) side. The non-insertion portion 73 is located outward of the cover 32.

In the vehicle seat 1, the seat back 3 is rotatably pivoted to the seat cushion 2, and the striker 70 is inserted between the first portion 35*b*1 and the slide portion 36*b* formed at the elongated holes 33*a*, 34*a* of the cover 32 of the seat back 3 (back frame 30). Thus, the part where the seat back 3 is pivoted to the seat cushion 2 and the part where the striker 70 is inserted to the seat back 3 are supported at two points, whereby rigidity of the entire vehicle seat 1 can be improved while inclination of the seat back 3 toward the stand-up direction and inclination of the seat back 3 toward the backward inclining direction are enabled.

Figure 5B:
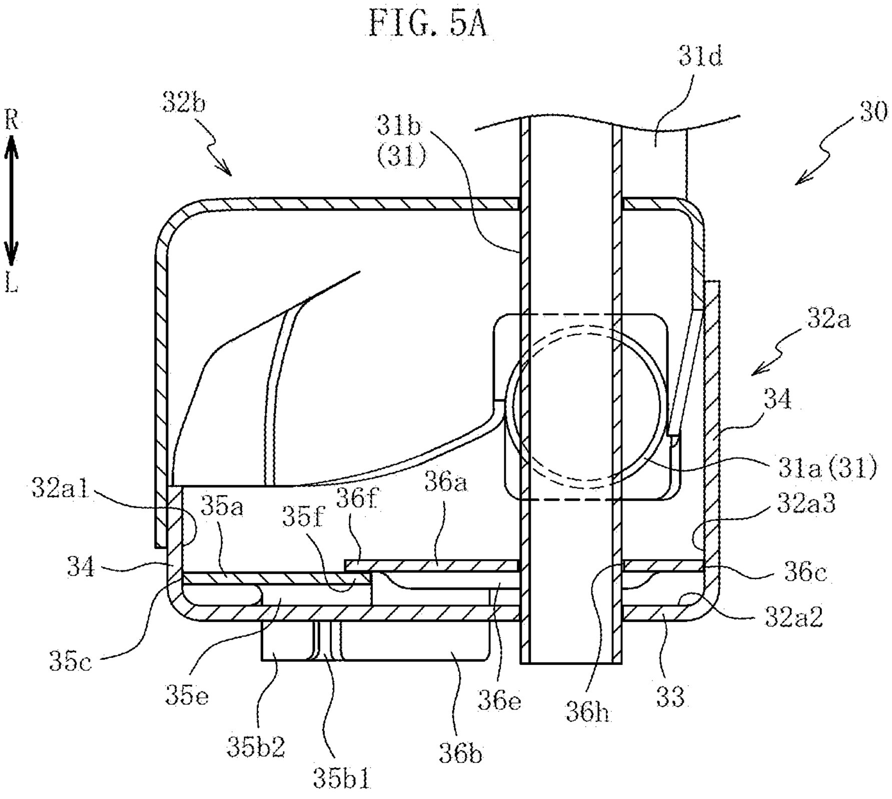
FIG. 5B is a sectional view of the back frame along line Vb-Vb in FIG. 4A.

With reference to FIG. 5A and FIG. 5B, the first cover 32*a* and the second cover 32*b* will be described. FIG. 5A is a sectional view of the back frame 30 along line Va-Va in FIG. 4A, and FIG. 5B is a sectional view of the back frame 30 along line Vb-Vb in FIG. 4A. FIG. 5A is a cross-section taken along a plane parallel to the floor surface Bd1 of the vehicle body Bd, and FIG. 5B is a cross-section taken along a plane perpendicular to the direction in which the left side portion 31*c* of the pipe 31 extends. In FIG. 5B, the lock mechanism 39 is not shown.

As shown in FIG. 5A and FIG. 5B, the first cover 32*a* and the second cover 32*b* are formed in C shapes in a sectional view. In the seating position, the first cover 32*a* includes the side surface portion 33 forming an outer surface on the left side (arrow L direction side) of the first cover 32*a*, and the erected portions 34 erected rightward (arrow R direction) from both ends in the front-back direction (arrow F-B direction) of the side surface portion 33. An inner surface of the first cover 32*a* includes an inner surface 32*a*1 formed by one of the erected portions 34 that is located on the front (arrow F direction) side, an inner surface 32*a*2 formed by the side surface portion 33, and an inner surface 32*a*3 formed by another of the erected portions 34 that is located on the back (arrow B direction) side.

At respective ends of the substantially C shapes of the first cover 32*a* and the second cover 32*b*, an outer surface of an end on one side of the first cover 32*a* and an inner surface of an end on one side of the second cover 32*b* are joined to each other, and an inner surface of an end on another side of the first cover 32*a* and an outer surface of an end on another side of the second cover 32*b* are joined to each other.

The first reinforcement member 35, the second reinforcement member 36, and the lock mechanism 39 are provided in an internal space formed by the first cover 32*a* and the second cover 32*b* (see FIG. 6A). Since the cover 32 is formed by a plurality of members, i.e., the first cover 32*a* and the second cover 32*b*, the first reinforcement member 35, the second reinforcement member 36, and the lock mechanism 39 can be attached in the internal space more easily than in a case of a cover formed by one tubular member.

The first cover 32*a* and the second cover 32*b* are joined with their ends staggered from each other, and therefore, even if dimensional accuracy of one of the first cover 32*a* and the second cover 32*b* is low, both covers can be easily attached to each other with the position of the other cover adjusted.

The first cover 32*a* and the second cover 32*b* hold an outer peripheral surface of the one end 31*a* of the pipe 31 therebetween by inner surfaces of their lower ends (see FIG. 5B). Thus, a load applied to the first cover 32*a* and the second cover 32*b* can be dispersed to the one end 31*a*. As a result, the strengths of the first cover 32*a* and the second cover 32*b* can be improved.

The elongated hole 33*a* has a shape extending in the up-down direction (arrow U-D direction). The first reinforcement member 35 is provided at an inner surface on the upper (arrow U direction) side and an inner surface 33*a*1 on the front (arrow F direction) side extending in the up-down direction of the elongated hole 33*a*, and the second reinforcement member 36 is provided at an inner surface 33*a*2 on the back (arrow B direction) side extending in the up-down direction of the elongated hole 33*a*. A space between the first portion 35*b*1 (described later) of the first reinforcement member 35 and the slide portion 36*b* (described later) of the second reinforcement member 36 forms a path through which the striker 70 passes, in a state in which the vehicle seat 1 is between the seating position and the relaxation position (see FIG. 9A, FIG. 9B and FIG. 9C).

At a lower end of the elongated hole 33*a*, the slit 33*b* is formed so as to communicate with the elongated hole 33*a* and extends from the communication part toward the erected portion 34 on the back (arrow B direction) side of the cover 32 (first cover 32*a*) so as to open at the erected portion 34. A width L3 (see FIG. 4A) of the slit 33*b* is set to be greater than an opposing distance L2 between the first portion 35*b*1 of the first reinforcement member 35 and the slide portion

36*b* of the second reinforcement member 36 described later. The opposing distance L2 is greater than a size L1 (see FIG. 4B) of the outer diameter of the striker 70.

Since the opposing distance L2 is set to be greater than the size L1 of the outer diameter of the striker 70, contact with the striker 70 can be received by only one of the first portion 35*b*1 and the slide portion 36*b* when the striker 70 passes between the first portion 35*b*1 and the slide portion 36*b*. Thus, the striker 70 can easily slide between the first portion 35*b*1 and the slide portion 36*b*.

In addition, since the width L3 is set to be greater than the opposing distance L2 and is set to be sufficiently greater than the size L1 of the outer diameter of the striker 70, the striker 70 can be easily inserted into the elongated hole 33*a* from the opening of the slit 33*b*, in any position where the vehicle seat 1 is between the seating position and the relaxation position.

At the erected portion 34 on the back (arrow B direction) side, the elongated hole 34*a* is formed to extend in the up-down direction (arrow U-D direction) and forms a path through which the striker 70 passes in a state in which the seat back 3 is between the seating position and the relaxation position. At a lower end of the elongated hole 34*a*, the slit 34*b* is formed so as to communicate with the elongated hole 34*a* and extends from the communication part toward the side surface portion 33 of the cover 32 (first cover 32*a*) so as to open at the side surface portion 33 and connect to the slit 33*b*. A width L4 of the elongated hole 34*a* is set to be greater than the opposing distance L2 between the first portion 35*b*1 and the slide portion 36*b*. A width L5 of the slit 34*b* is set to be substantially the same as the width L3 of the slit 33*b*.

Since the width L4 of the elongated hole 34*a* is set to be greater than the opposing distance L2, the striker 70 becomes less likely to contact with an inner surface of the elongated hole 34*a* when the striker 70 passes between the first portion 35*b*1 and the slide portion 36*b*. Thus, damage of the first cover 32*a* due to contact of the striker 70 with the inner surface of the elongated hole 34*a* is less likely to occur.

In addition, since the width L5 is set to be substantially the same as the width L3 and is set to be sufficiently greater than the size L1 of the outer diameter of the striker 70, the striker 70 can be easily inserted into the elongated hole 34*a* from the opening of the slit 34*b*, in any position where the vehicle seat 1 is between the seating position and the relaxation position.

With reference to FIG. 5A, FIG. 5B and FIG. 6A, the lock mechanism 39 will be described. FIG. 6A is a sectional view of the back frame 30 along line VIa-VIa in FIG. 5A. The back frame 30 includes the lock mechanism 39 provided at the first cover 32*a*. The lock mechanism 39 is configured to be able to switch between a locked state in which a part of a surface on which the striker 70 slides is formed and a lock-released state in which the part is not formed, in a state in which the vehicle seat 1 is between the seating position and the relaxation position.

The lock mechanism 39 includes a nail 39*a* formed in a hook shape, a shaft portion 39*b* by which the nail 39*a* is rotatably pivoted relative to the first cover 32*a*, and a lock operation portion (not shown) for switching between the locked state and the lock-released state through an operation by a seated person.

The nail 39*a* has, at the communication part between the elongated hole 33*a* and the slit 33*b*, a contact surface 39*a*1 which is a surface on a side where the striker 70 contacts in a state in which the vehicle seat 1 is between the seating position and the relaxation position. At this time, the contact surface 39*a*1 is located substantially on an extended line from a surface of the slide portion 36*b* on a side where the striker 70 slides. The contact surface 39*a*1 forms a substantially triangular distal end, together with a back surface 39*a*2 which is a surface on a side opposite to the contact surface 39*a*1.

In a state in which the vehicle seat 1 is between the seating position and the relaxation position, since the contact surface 39*a*1 is located substantially on the extended line from the surface of the slide portion 36*b* on the side where the striker 70 slides, sliding of the striker 70 between the slide portion 36*b* and the contact surface 39*a*1 can be made favorable (less likely to be caught). Thus, operability when the seat back 3 is inclined toward the stand-up direction and inclined toward the backward inclining direction can be improved.

The shaft portion 39*b* passes through a shaft hole 35*g* of the first reinforcement member 35, penetrates the first cover 32*a*, and is rotatable relative to the first reinforcement member 35 and the first cover 32*a*.

The shaft portion 39*b* is provided with a spring 39*b*1 biasing the distal end of the nail 39*a* in a rotation direction toward a lock restriction portion 36*g* (clockwise in FIG. 6A). When the distal end of the nail 39*a* contacts with the lock restriction portion 36*g* of the second reinforcement member 36, the nail 39*a* is restricted from rotating any more.

In the locked state of the lock mechanism 39, the nail 39*a* closes the communication part between the elongated hole 33*a* and the slit 33*b* (see FIG. 9A, FIG. 9B and FIG. 9C), whereby the striker 70 can be prevented from being pulled out from the cover 32 through the slit 33*b*.

In the lock-released state of the lock mechanism 39, the nail 39*a* opens the communication part between the elongated hole 33*a* and the slit 33*b* (see FIG. 10A), whereby the striker 70 can be pulled out from the cover 32 through the slits 33*b*, 34*b*. Therefore, the fall-down action can be performed just by collapsing the seat back 3 while operating the lock operation portion to release lock of the lock mechanism 39. Thus, operability in the fall-down action can be improved.

Figure 6B:
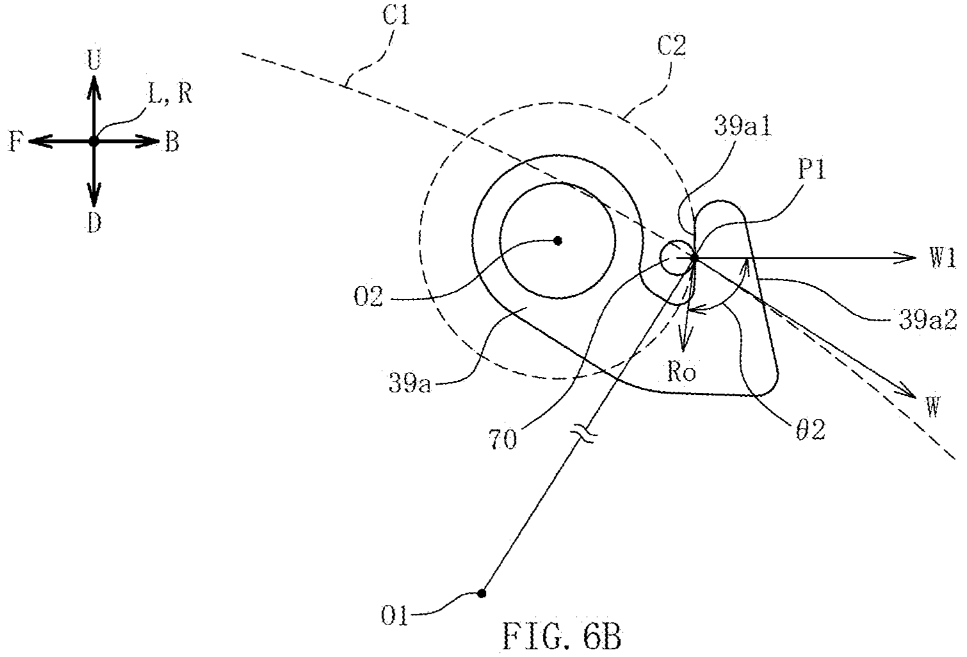
FIG. 6B is a schematic view showing the relationship between a lock mechanism and a load inputted to a striker.

With reference to FIG. 6B, the relationship between the contact surface 39*a*1 of the lock mechanism 39 and a load W inputted from the striker 70 to the lock mechanism 39 will be described. FIG. 6B is a schematic view showing the relationship between the lock mechanism 39 and the load W inputted to the striker 70.

The axis O1 is an axis of a shaft (first shaft 24) about which the seat back 3 is pivoted to the seat cushion 2 and is rotated, an axis O2 is an axis about which the nail 39*a* is rotated relative to the first cover 32*a*, and a contact point P1 is a tangent point at which the striker 70 contacts with the contact surface 39*a*1 of the nail 39*a* of the lock mechanism 39, in the seating position of the vehicle seat 1. In addition, a virtual circle C1 is a virtual circle formed about the axis O1 and passing through the contact point P1, and a virtual circle C2 is a virtual circle formed about the axis O2 and passing through the contact point P1. An arrow Ro indicates a direction in which the nail 39*a* is rotated to release lock, at the contact point P1.

In the lock mechanism 39 in a state in which the vehicle seat 1 is in the seating position, since the striker 70 is fixed to the wall portion Bd2 of the vehicle body Bd, when a load is applied in a direction to incline the seat back 3 (back frame 30) frontward, the load W is inputted to the striker 70 in a tangent direction of the virtual circle C1 toward a side opposite to the direction to incline the seat back 3 frontward. Since the striker 70 and the contact surface 39*a*1 contact with each other at the contact point P1, the load W is decomposed into a force component toward the normal direction of the contact surface 39*a*1 from the contact point P1, and a force component toward a parallel direction. In a view as seen from the axial direction of the axis O1, an angle formed by the input direction of the load W and, of the contact surface 39*a*1, a surface upward (arrow U direction) of the contact point P1, is set to be greater than 45° and smaller than 135°. In this case, of the force component in the normal direction and the force component in the parallel direction of the load W, the force component in the normal direction is greater. In the present embodiment, in the lock mechanism 39, an angle θ2 formed by a force component W1 and the arrow Ro indicating the direction in which the nail 39*a* is rotated to release lock is set at substantially 90°. Although θ2 is set at substantially 90° in the present embodiment, the angle θ2 may be an obtuse angle (90°<θ2<180°).

Since the angle θ2 formed by the force component W1 and the direction (arrow Ro) in which the lock mechanism 39 is rotated is set at substantially 90°, the force component W1 becomes less likely to act in the arrow Ro direction even if the load W is inputted from the striker 70 to the contact surface 39*a*1 in the rotation direction about the axis O1 of the first shaft 24. Thus, the nail 39*a* becomes less likely to rotate in the lock releasing direction. As a result, lock of the lock mechanism 39 becomes less likely to be released by a load inputted frontward (arrow F direction) from the back (arrow B direction) side of the seat back 3 in the seating position.

Figure 7A:
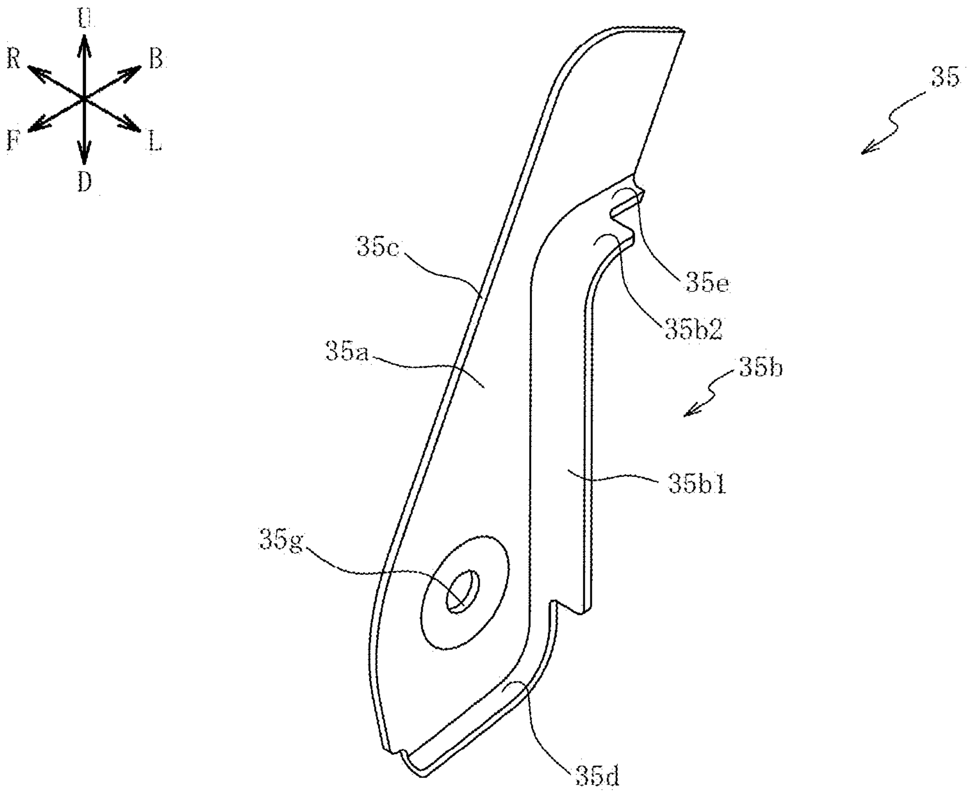
FIG. 7A is a perspective view of a first reinforcement member.
Figure 7B:
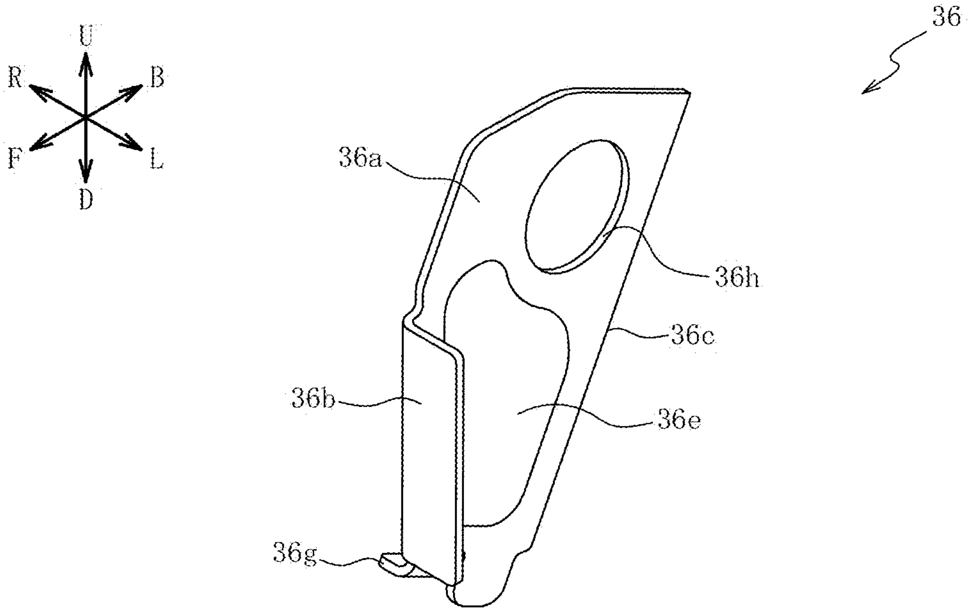
FIG. 7B is a perspective view of a second reinforcement member.

With reference to FIG. 7, the first reinforcement member 35 and the second reinforcement member 36 will be described. FIG. 7A is a perspective view of the first reinforcement member 35, and FIG. 7B is a perspective view of the second reinforcement member 36.

As shown in FIG. 7A, the first reinforcement member 35 is a member made of steel and includes a flat plate-shaped base 35*a* and a slide portion 35*b* formed vertically from the base 35*a*. That is, the base 35*a* is formed vertically from the slide portion 35*b*. The base 35*a* has the shaft hole 35*g* to which the shaft portion 39*b* of the lock mechanism 39 is rotatably pivoted. An end surface 35*c* of the base 35*a* on a side opposite to the side where the slide portion 35*b* is formed vertically, has a shape corresponding to the inner surface 32*a*1 of the first cover 32*a* and contacts with the inner surface 32*a*1 (see FIG. 6A).

The slide portion 35*b* includes the first portion 35*b*1 extending in parallel to the direction in which the striker 70 slides in a state in which the vehicle seat 1 is between the seating position and the relaxation position, a second portion 35*b*2 bent from one end of the first portion 35*b*1 and extending in a direction perpendicular to the first portion 35*b*1, a first contact portion 35*d* extending along an outer edge of the base 35*a* from another end of the first portion 35*b*1, and a second contact portion 35*e* extending along an outer edge of the base 35*a* from the second portion 35*b*2. The first contact portion 35*d* and the second contact portion 35*e* contact with the inner surface 32*a*2.

The lengths in which the first contact portion 35*d* and the second contact portion 35*e* extend vertically from the base 35*a* are set to be shorter than the lengths in which the first portion 35*b*1 and the second portion 35*b*2 extend vertically from the base 35*a*.

The first portion 35*b*1 has a shape corresponding to the inner surface 33*a*1 on the front (arrow F direction) side of the elongated hole 33*a*, and the second portion 35*b*2 has a shape corresponding to an inner surface on the upper (arrow U direction) side of the elongated hole 33*a*. The first portion 35*b*1 contacts with the inner surface 33*a*1 (see FIG. 5A, FIG. 6A, FIG. 9A, FIG. 9B and FIG. 9C). The first portion 35*b*1 is a part on which the striker 70 slides when the seat back 3 is inclined toward the stand-up direction in a state in which the vehicle seat 1 is between the seating position and the relaxation position. The first portion 35*b*1 is a part on which the striker 70 slides also when the seat back 3 is inclined toward the backward inclining direction in a state in which the vehicle seat 1 is between the seating position and the relaxation position and a seated person leans against the seat back 3. In addition, the first portion 35*b*1 and the slide portion 36*b* can become, no matter which part, a part to slide on the striker 70, depending on the direction of a load applied to the seat back 3.

Regarding the first reinforcement member 35, since the end surface 35*c* contacts with the inner surface 32*a*1, when the seat back 3 is inclined toward the stand-up direction, a load inputted from the striker 70 to the first portion 35*b*1 is transmitted in an order of the first portion 35*b*1, the end surface 35*c* of the base 35*a*, and then the inner surface 32*a*1 of the first cover 32*a*, whereby the load can be dispersed. As a result, the strengths of the first reinforcement member 35 and the first cover 32*a* can be improved.

Regarding the first reinforcement member 35, since the first portion 35*b*1 contacts with the inner surface 33*a*1, when the seat back 3 is inclined toward the stand-up direction, a load inputted from the striker 70 to the first portion 35*b*1 is transmitted from the first portion 35*b*1 to the inner surface 33*a*1 of the elongated hole 33*a*, whereby the load can be dispersed. As a result, the strength of the first reinforcement member 35 can be improved.

As shown in FIG. 7B, the second reinforcement member 36 is a member made of steel and includes a flat plate-shaped base 36*a* and a slide portion 36*b* formed vertically from the base 36*a*. That is, the base 36*a* is formed vertically from the slide portion 36*b*.

The base 36*a* has a pipe hole 36*h* through which the end 31*b* of the upper portion 31*f* of the pipe 31 is inserted and which is joined to the upper portion 31*f*. Thus, a load inputted to the second reinforcement member 36 is transmitted to the pipe 31, whereby the load can be dispersed. As a result, the strength of the second reinforcement member 36 can be improved.

The base 36*a* is further provided with the lock restriction portion 36*g* formed vertically on a side opposite to the side where the slide portion 36*b* is formed vertically. The lock restriction portion 36*g* is a part with which the distal end of the nail 39*a* of the lock mechanism 39 contacts so as to restrict rotation of the nail 39*a* biased by the spring 39*b*1. A recess 36*e* recessed in the direction in which the slide portion 36*b* is formed vertically is formed at a central part of the base 36*a*. The recess 36*e* is a part for inhibiting the base 36*a* from being bent by a load applied from the slide portion 36*b* toward the base 36*a*.

The slide portion 36*b* extends in parallel to the direction in which the striker 70 slides in a state in which the vehicle seat 1 is between the seating position and the relaxation position. An end surface 36*c* of the base 36*a* on a side opposite to the side where the slide portion 36*b* is formed vertically, has a shape corresponding to the inner surface 32*a*3 of the first cover 32*a* and contacts with the inner surface 32*a*3 (see FIG. 6A).

The slide portion 36*b* has a shape corresponding to the inner surface 33*a*2 on the back (arrow B direction) side of the elongated hole 33*a*, and contacts with the inner surface 33*a*2 (see FIG. 5A, FIG. 6A, FIG. 9A, FIG. 9B and FIG.

9C). The slide portion 36*b* is a part on which the striker 70 slides when the seat back 3 is inclined toward the backward inclining direction in a state in which the vehicle seat 1 is between the seating position and the relaxation position.

Since the second reinforcement member 36 has the end surface 36*c* in contact with the inner surface 32*a*3, when the seat back 3 is inclined toward the backward inclining direction, a load inputted from the striker 70 to the slide portion 36*b* is transmitted in an order of the slide portion 36*b*, the end surface 36*c* of the base 36*a*, and then the inner surface 32*a*3 of the first cover 32*a*, whereby the load can be dispersed. As a result, the strengths of the second reinforcement member 36 and the first cover 32*a* can be improved.

Since the second reinforcement member 36 has the slide portion 36*b* in contact with the inner surface 33*a*2, when the seat back 3 is inclined toward the backward inclining direction, a load inputted from the striker 70 to the slide portion 36*b* is transmitted from the slide portion 36*b* to the inner surface 33*a*2 of the elongated hole 33*a*, whereby the load can be dispersed. As a result, the strength of the second reinforcement member 36 can be improved.

The first reinforcement member 35 and the second reinforcement member 36 are welded to each other at welded portions 35*f*, 36*f* (see FIG. 5B and FIG. 6A). Thus, a load inputted to one of the first reinforcement member 35 and the second reinforcement member 36 is transmitted to the other of the first reinforcement member 35 and the second reinforcement member 36, whereby the load can be dispersed. As a result, the strengths of the first reinforcement member 35 and the second reinforcement member 36 can be improved.

Figure 8B:
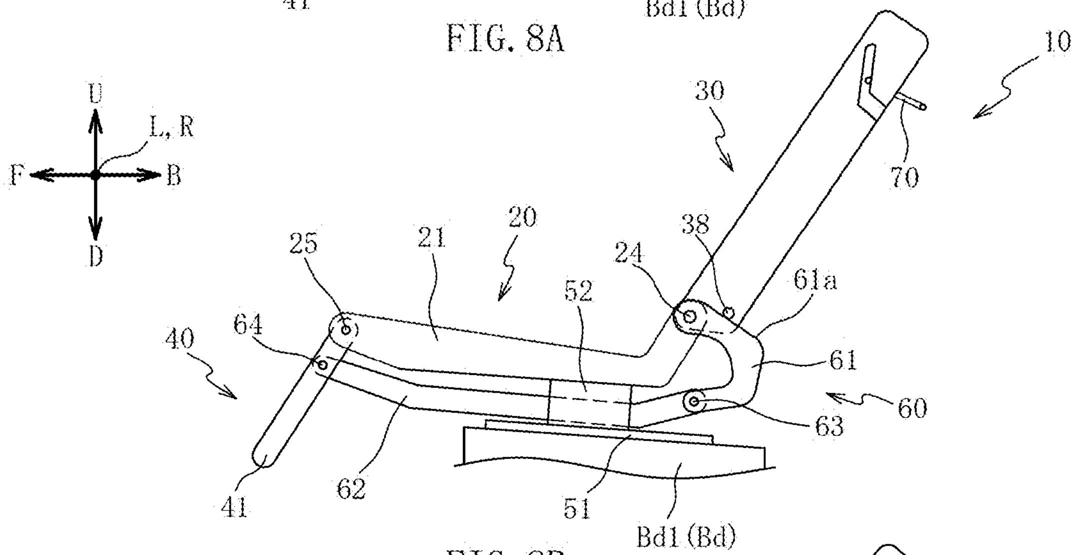
FIG. 8B is a schematic view of the seat frame in a work position.
Figure 8C:
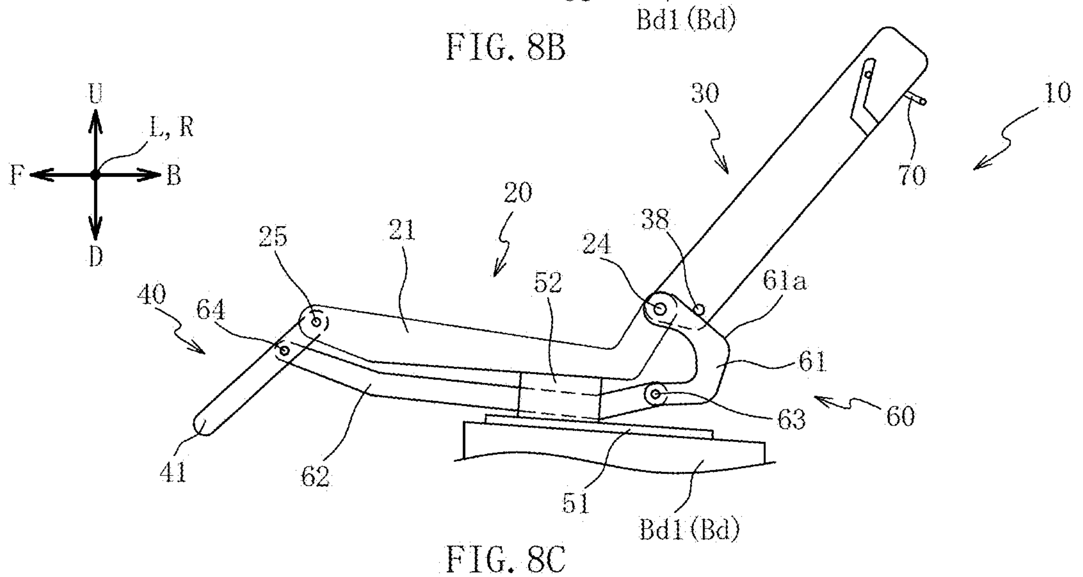
FIG. 8C is a schematic view of the seat frame in a relaxation position.

Next, with reference to FIG. 8A, FIG. 8B, FIG. 8C, FIG. 9A, FIG. 9B and FIG. 9C, a coordination operation of the vehicle seat 1 (seat frame 10) will be described. FIG. 8A is a schematic view of the seat frame 10 in the seating position, FIG. 8B is a schematic view of the seat frame 10 in the work position, and FIG. 8C is a schematic view of the seat frame 10 in the relaxation position. FIG. 8A, FIG. 8B and FIG. 8C is schematic views schematically showing the seat frame 10 as seen from the same direction (arrow IVa in FIG. 2) as in FIG. 4A. FIG. 9A is a side view of the cover 32 in the seating position, FIG. 9B is a side view of the cover 32 in the work position, and FIG. 9C is a side view of the cover 32 in the relaxation position. FIG. 9A, FIG. 9B and FIG. 9C illustrates the cover 32 part in the seating position, the work position, and the relaxation position in FIG. 8A, FIG. 8B and FIG. 8C.

In FIG. 9A, FIG. 9B and FIG. 9C, for convenience of description, a manner when the vehicle seat 1 moves from the seating position to the relaxation position (a manner in which the striker 70 slides on the nail 39*a* and the slide portion 36*b*) is shown. When the vehicle seat 1 moves from the relaxation position to the seating position, the striker 70 slides on the first portion 35*b*1.

First, a procedure in which the vehicle seat 1 is operated from the seating position to the relaxation position will be described. An operation from the seating position to the work position and an operation from the relaxation position to the work position are the same as an operation from the seating position to the relaxation position and an operation from the relaxation position to the seating position. Therefore, the operation from the seating position to the relaxation position and the operation from the relaxation position to the seating position will be described while the description of the operations to the work position which is a position between the above two positions is omitted.

As shown in FIG. 8A, FIG. 8B, FIG. 8C, FIG. 9A, FIG. 9B and FIG. 9C, in the seating position, a seated person releases slide lock to perform sliding movement of the cushion frame 20 (seat cushion 2) toward the front (arrow F direction) side. Since the striker 70 is inserted into the back frame 30 (seat back 3), the seat back 3 moves while the slide portion 36*b* of the second reinforcement member 36 and the nail 39*a* contact with the striker 70. By a force that the slide portion 36*b* and the nail 39*a* receive from the striker 70, the seat back 3 is inclined toward the backward inclining direction about the axis O1 of the first shaft 24.

At this time, if the seated person leans so as to push the seat back 3 backward (arrow B direction), since the seat back 3 is supported by the striker 70, a part of the seat back 3 that is pivoted by the first shaft 24 is pushed frontward. Thus, the seat cushion 2 can easily perform sliding movement frontward. As a result, operability of a reclining operation can be improved.

In a state in which the vehicle seat 1 is between the seating position and the relaxation position, the center of gravity of the seat back 3 is located backward (arrow B direction) relative to the axis O1 of the first shaft 24, and the upper (arrow U direction) surface of the outer periphery 61*a* of the link bracket 61 is located downward (arrow D direction) of the hinge pin 38. Thus, by the self-weight of the back frame 30, the hinge pin 38 contacts with the upper (arrow U direction) surface of the outer periphery 61*a* of the link bracket 61.

When the seat back 3 is inclined toward the backward inclining direction, the hinge pin 38 pushes the upper (arrow U direction) surface of the outer periphery 61*a* of the link bracket 61 downward (arrow D direction). The link bracket 61 pushed by the hinge pin 38 is rotated in a direction to push the link bar 62 (clockwise in FIG. 8A to FIG. 8C) about the axis O1 of the first shaft 24. The link bar 62 pushed by the link bracket 61 is pushed in a direction to push the leg frame 40 (side frame 41) frontward (arrow F direction) while adjusting an angle by the link shaft 63. The hinge pins 38, the link brackets 61, the link bars 62, and the link shafts 63 are respectively provided as pairs in the left-right direction (arrow L-R direction), and the members of each pair have the same configuration and perform the same operation.

Since the side frame 41 of the leg frame 40 and the link bar 62 are pivoted to each other by the third shaft 64 and one end of the side frame 41 and the cushion frame 20 (seat cushion 2) are pivoted to each other by the second shaft 25, the leg rest 4 is rotated around the second shaft 25 (clockwise in FIG. 8A, FIG. 8B and FIG. 8C) relative to the seat cushion 2 so as to be inclined toward a frontward (arrow F direction) protruding direction.

Next, a procedure in which the vehicle seat 1 is operated from the relaxation position to the seating position will be described. As shown in FIG. 8A, FIG. 8B, FIG. 8C, FIG. 9A, FIG. 9B and FIG. 9C, in the relaxation position, while a seated person is rising from the posture of leaning back against the back frame 30 (seat back 3), the seated person operates the slide lock operation portion of the seat slide 50, to release slide lock. At this time, by shifting of the weight of the seated person through posture change, the seat cushion 2 performs sliding movement toward the back (arrow B direction) side. Since the striker 70 is inserted into the seat back 3, the seat back 3 moves while the first portion 35*b*1 of the first reinforcement member 35 contacts with the striker 70. By a force that the first portion 35*b*1 receives from the striker 70, the seat back 3 is inclined toward the stand-up direction about the axis O1 of the first shaft 24.

When the seat back 3 is inclined toward the stand-up direction, the hinge pin 38 is moved so as to escape in a direction to separate from the upper (arrow U direction) surface of the outer periphery 61*a* of the link bracket 61. Since engagement with the hinge pin 38 pushing the upper (arrow U direction) surface of the link bracket 61 downward (arrow D direction) is released, the force in the direction in which the link bar 62 pushes the leg frame 40 (side frame 41) is eliminated. At this time, the leg frame 40 is inclined in a receding direction by the self-weight. The leg frame 40 inclined toward the receding direction pushes the link bar 62 toward the back (arrow B direction) side, whereby the link bracket 61 is rotated in a direction (counterclockwise in FIG. 8A (a) to FIG. 8C) to bring back the link bar 62 about the axis O1 of the first shaft 24, so that the link bracket 61 contacts with the hinge pin 38.

Figure 10A:
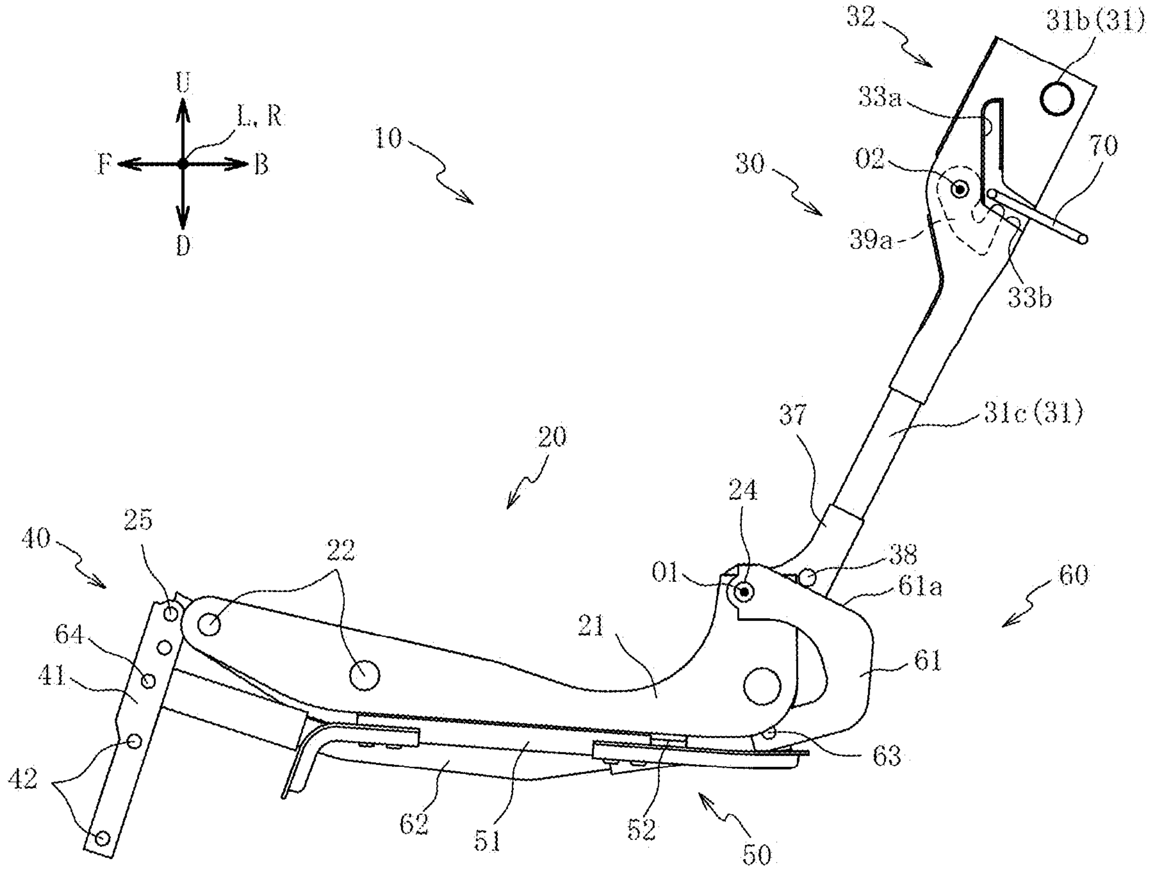
FIG. 10A is a side view of the seat frame in a lock-released state.

Next, with reference to FIG. 10A and FIG. 10B, the fall-down action of the vehicle seat 1 (seat frame 10) will be described. FIG. 10A is a side view of the seat frame 10 in the lock-released state, and FIG. 10B is a side view of the seat frame 10 in the fallen-down state.

First, an operation of bringing the back frame 30 (seat back 3) into the fallen-down state from the seating position will be described. As shown in FIG. 10A, in the vehicle seat 1 in the seating position, the striker 70 is located at the parts where the elongated holes 33*a*, 34*a* and the slits 33*b*, 34*b* communicate with each other. When the lock operation portion of the lock mechanism 39 is operated, the nail 39*a* is rotated in a direction to escape from the communication part where the elongated hole 33*a* and the slit 33*b* communicate with each other, so that the communication part (see FIG. 9A) closed by the nail 39*a* is opened. Since the communication part is opened, the striker 70 is allowed to be pulled out from the cover 32.

At this time, the slits 33*b*, 34*b* are set at such angles that the inner sides of the slits 33*b*, 34*b* of the cover 32 (first cover 32*a*) do not interfere even when the seat back 3 is rotated in the forward-inclined direction about the axis O1. Thus, the seat back 3 can be rotated in the forward-inclined direction from the seating position about the axis O1.

Figure 10B:
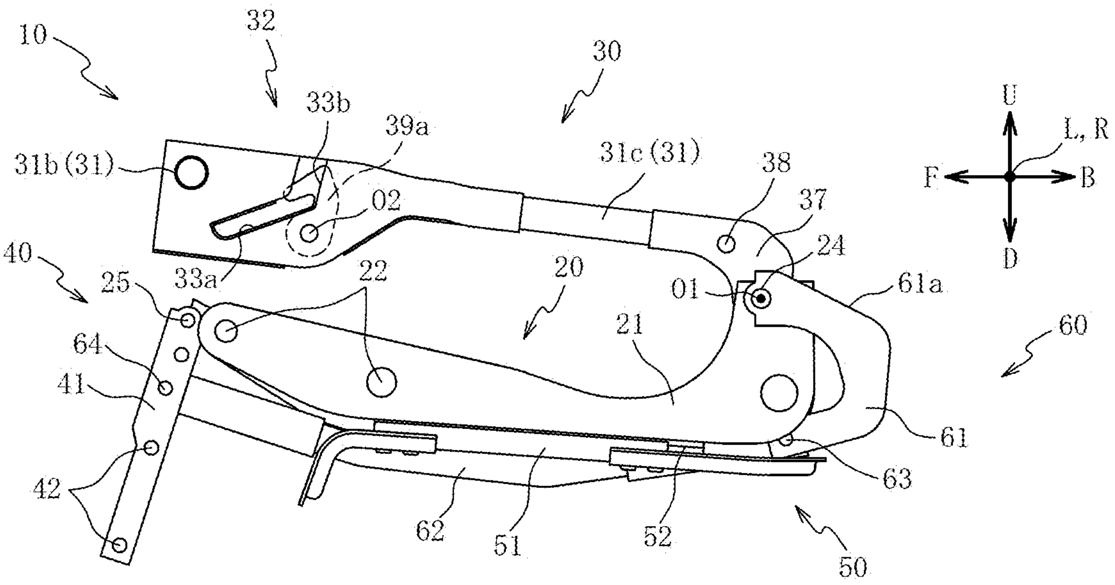
FIG. 10B is a side view of the seat frame in a fallen-down state.

As shown in FIG. 10B, the vehicle seat 1 is brought into a fallen-down state with the seat back 3 inclined forward from the state shown in FIG. 10A. In the fall-down action of the vehicle seat 1, since the hinge pin 38 is located at a position separate from the upper (arrow U direction) surface of the link bracket 61 and there are no other members on a path through which the seat back 3 and the hinge pin 38 pass during forward inclination from the seating position, the seat back 3 can be further inclined from the seating position while engagement between the hinge pin 38 and the link bracket 61 is released.

Next, an operation of bringing back the seat back 3 to the seating position from the fallen-down state will be described. When the seat back 3 is inclined toward the backward inclining direction about the axis O1, the back surface 39*a*2 of the nail 39*a* of the lock mechanism 39 comes into contact with the striker 70 at a position slightly before the seating position. When the seat back 3 is further inclined toward the backward inclining direction from this state, the nail 39*a* escapes from the communication part where the elongated hole 33*a* and the slit 33*b* communicate with each other, and the striker 70 is inserted into the elongated hole 33*a*. Then, the nail 39*a* is biased by the spring 39*b*1 so as to return to a locked state of closing the communication part where the elongated hole 33*a* and the slit 33*b* communicate with each other.

At this time, at the contact point where the back surface 39*a*2 and the striker 70 contact with each other, an angle formed by the direction in which the striker 70 moves relative to the seat back 3 toward the back surface 39*a*2 of the lock mechanism 39 and a part of the back surface 39*a*2 that extends downward (arrow D direction) from the contact point, is set to be an acute angle (greater than 0° and smaller than 90°). In this case, at the contact point, a load inputted from the striker 70 can be directed toward the arrow Ro direction of the lock mechanism 39 (a direction to rotate the nail 39*a*). This makes it unnecessary to operate the lock operation portion of the lock mechanism 39 when bringing back the seat back 3 to the seating position from the fallen-down state. Thus, operability can be improved.

While the present invention has been described above with reference to the embodiment, the present invention is not limited to the above embodiment at all. It can be easily understood that various modifications can be devised without departing from the gist of the present invention.

In the present embodiment, the case where the vehicle seat 1 can perform the fall-down action has been described. However, the vehicle seat 1 may be a type that cannot perform the fall-down action. In this case, the hinge pin 38 is inserted into an elongated hole provided to the link bracket 61 and is slidably supported, so that engagement of the hinge pin 38 with the link bracket 61 is not released.

In the present embodiment, the case where the striker 70 has a U shape has been described. However, the striker 70 may have an I shape.

In the present embodiment, the case where the striker 70 is pulled out by passing through the slits 33*b*, 34*b* from the elongated holes 33*a*, 34*a* has been described. However, the striker 70 may be pulled out by receding in a direction (arrow L direction in FIG. 4B) toward the wall portion Bd2 of the vehicle body Bd from the cover 32.

In the present embodiment, the case where the mechanism for performing slide lock of the vehicle seat 1 is provided on the seat cushion 2 side (seat slide 50) has been described. However, the seat back 3 or the leg rest 4 may have a lock mechanism for restricting the seating position, the work position, and the relaxation position.

In the present embodiment, the case where there is only one slide-lock position (work position) between the seating position and the relaxation position of the vehicle seat 1 has been described. However, a plurality of slide-lock positions may be provided or two slide-lock positions at the seating position and the relaxation position may be provided.

In the present embodiment, the case where the slide plane 53 on which the seat cushion 2 performs sliding movement is downward sloped from the front (arrow F direction) side toward the back (arrow B direction) side of the cushion frame 20 has been described. However, the slide plane 53 may be a plane perpendicular to the gravity direction.

In the present embodiment, the case of providing the first reinforcement member 35 and the second reinforcement member 36 has been described. However, one or both of the first reinforcement member 35 and the second reinforcement member 36 may be omitted.

In the present embodiment, the case where the first reinforcement member 35 and the second reinforcement member 36 are separate members has been described. However, they may be integrated as one member.

DESCRIPTION OF REFERENCE NUMERALS

1 vehicle seat
2 seat cushion
3 seat back
4 leg rest
32 cover (guide mechanism)

32*a*1, 32*a*2, 32*a*3 inner surface
33*a*, 34*a* elongated hole (first path)
33*b*, 34*b* slit (second path)
35 first reinforcement member (guide mechanism)
35*a* base (first vertically-formed portion)
35*b*1 first portion (first sliding portion)
35*c* end surface
36 second reinforcement member (guide mechanism)
36*a* base (second vertically-formed portion)
36*b* slide portion (second sliding portion)
36*c* end surface
38 hinge pin (engagement portion)
39 lock mechanism
39*a* nail (second sliding portion)
53 slide plane (plane)
60 link mechanism (coordination mechanism)
61 link bracket (connection member)
62 link bar (connection member)
63 link shaft (connection member)
70 striker (coordination mechanism)
Bd vehicle body

The invention claimed is:

1. A vehicle seat comprising:

a seat cushion provided at a floor surface of a vehicle body so as to be able to perform sliding movement;

a seat back rotatably pivoted to a back end side of the seat cushion and configured to be inclinable relative to the seat cushion;

a leg rest rotatably pivoted to a front end side of the seat cushion and configured to be inclinable relative to the seat cushion; and a coordination mechanism which coordinates sliding movement of the seat cushion, inclination of the seat back, and inclination of the leg rest with each other, wherein the coordination mechanism is configured to, in coordination with sliding movement of the seat cushion toward a front side, incline the seat back toward a backward inclining direction and incline the leg rest toward a frontward protruding direction, and in coordination with sliding movement of the seat cushion toward a back side, incline the seat back toward a stand-up direction and incline the leg rest toward a receding direction, the coordination mechanism includes a striker provided to the vehicle body, and a guide mechanism which is provided to the seat back and guides inclination of the seat back relative to the striker, the guide mechanism includes a cover formed in a hollow shape, and a first reinforcement member and a second reinforcement member provided to the cover, the first reinforcement member includes a first sliding portion which is slidable relative to the striker when the seat back is inclined, and a first vertically-formed portion formed vertically from the first sliding portion toward an inner surface of the cover, the second reinforcement member includes a second sliding portion which is provided so as to be opposed to the first sliding portion and is slidable relative to the striker when the seat back is inclined, and a second vertically-formed portion formed vertically from the second sliding portion toward the inner surface of the cover, and surfaces of the first sliding portion and the second sliding portion on a side opposite to a side where the striker slides, an end surface of the first vertically-formed portion, and an end surface of the second vertically-formed portion, are joined to the inner surface of the cover.

2. The vehicle seat according to claim 1, wherein a plane on which the seat cushion performs the sliding movement is downward sloped from the front side toward the back side.

3. The vehicle seat according to claim 2, wherein an angle of the downward sloping is set to be not greater than 4°.

4. The vehicle seat according to claim 1, wherein the seat back is inclined between a first position and a second position through coordination by the coordination mechanism, the guide mechanism includes a first path which is formed between the first sliding portion and the second sliding portion and through which the striker passes when the seat back is inclined between the first position and the second position, a second path which communicates with the first path and through which the striker passes when the seat back is inclined toward a frontward inclining direction from the first position, and a lock mechanism rotatably pivoted to the cover and having a nail forming at least a part of the second sliding portion, and the lock mechanism is able to switch, by rotating the nail, between a locked state in which the nail blocks the first path and the second path from communicating with each other, and a lock-released state in which the nail allows the first path and the second path to communicate with each other.

5. The vehicle seat according to claim 4, wherein the first position is located toward the stand-up direction of the seat back relative to the second position, the coordination mechanism includes an engagement portion provided to the seat back, and a connection member pivoted to the seat cushion, the seat back, and the leg rest, in a state in which the seat back is located between the first position and the second position, the connection member is provided on a side where the seat back is inclined toward the backward inclining direction, relative to the engagement portion, and the connection member is not provided on a side where the seat back is inclined toward the stand-up direction, relative to the engagement portion, and the seat cushion and the leg rest are formed such that a member that restricts movement of the seat back and the engagement portion is not provided on a path through which the seat back and the engagement portion move, when the lock mechanism is in the lock-released state and the seat back is inclined in a range from the first position to a position where the seat back overlaps the seat cushion.

6. A vehicle seat comprising:

a seat cushion provided at a floor surface of a vehicle body so as to be able to perform sliding movement;

a seat back rotatably pivoted to a back end side of the seat cushion and configured to be inclinable relative to the seat cushion;

a leg rest rotatably pivoted to a front end side of the seat cushion and configured to be inclinable relative to the seat cushion; and a coordination mechanism which coordinates sliding movement of the seat cushion, inclination of the seat back, and inclination of the leg rest with each other, wherein the coordination mechanism is configured to, in coordination with sliding movement of the seat cushion toward a front side, incline the seat back toward a backward inclining direction and incline the leg rest toward a frontward protruding direction, and in coordination with sliding movement of the seat cushion toward a back side, incline the seat back toward a stand-up direction and incline the leg rest toward a receding direction, the coordination mechanism includes a striker provided to the vehicle body, and a guide mechanism which is provided to the seat back and guides inclination of the seat back relative to the striker, and the guide mechanism includes a first path through which the striker passes when the seat back is inclined between a first position and a second position, a second path which communicates with the first path and through which the striker passes when the seat back is inclined toward a frontward inclining direction from the first position, and a lock switchable between a locked state in which the first path and the second path are blocked from communicating with each other, and a lock-released state in which the first path and the second path are allowed to communicate with each other.

* * * * *